April 12, 1932.  J. REECE ET AL  1,853,454
POWER TRANSMISSION
Filed Aug. 14, 1930    6 Sheets-Sheet 2
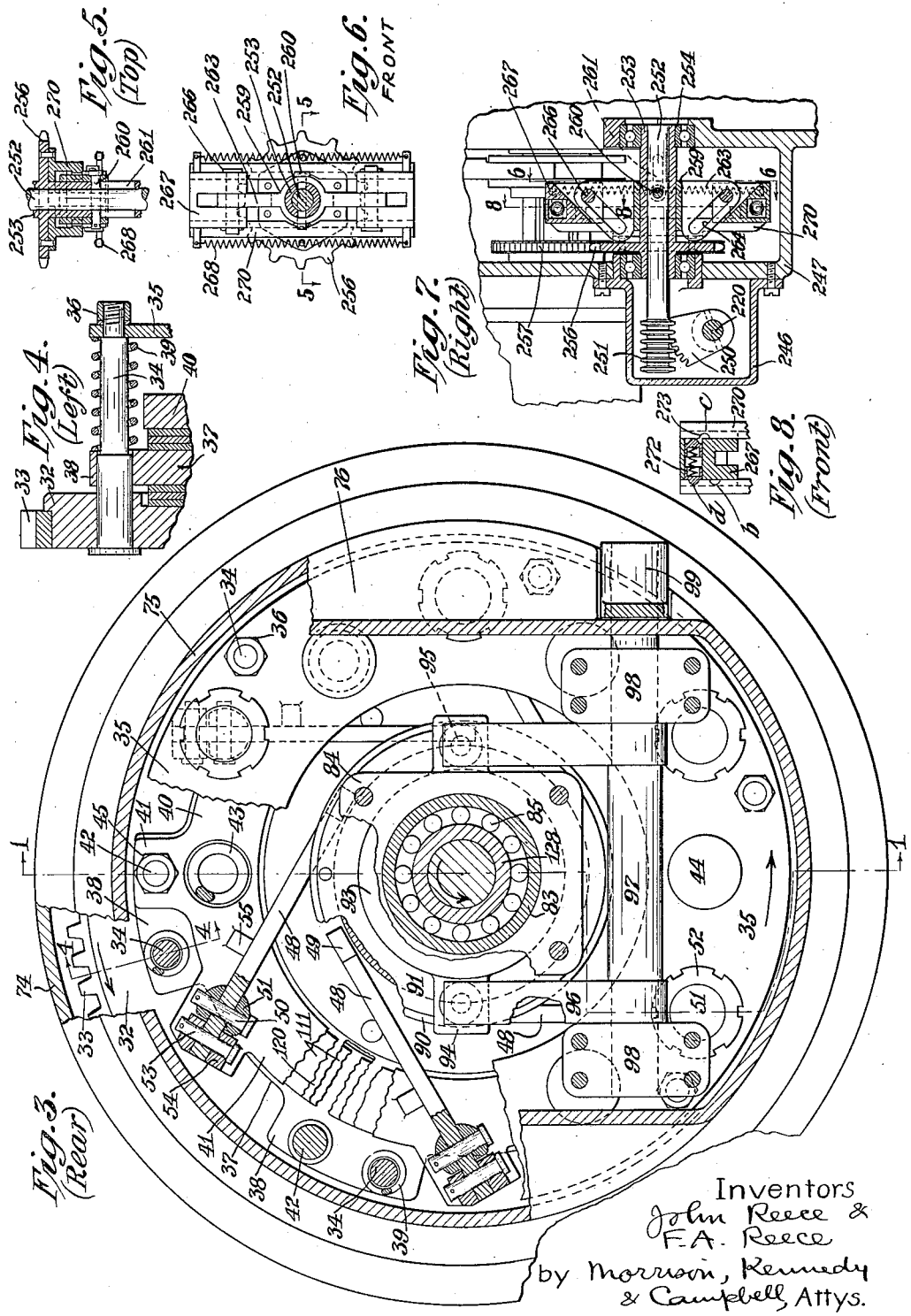

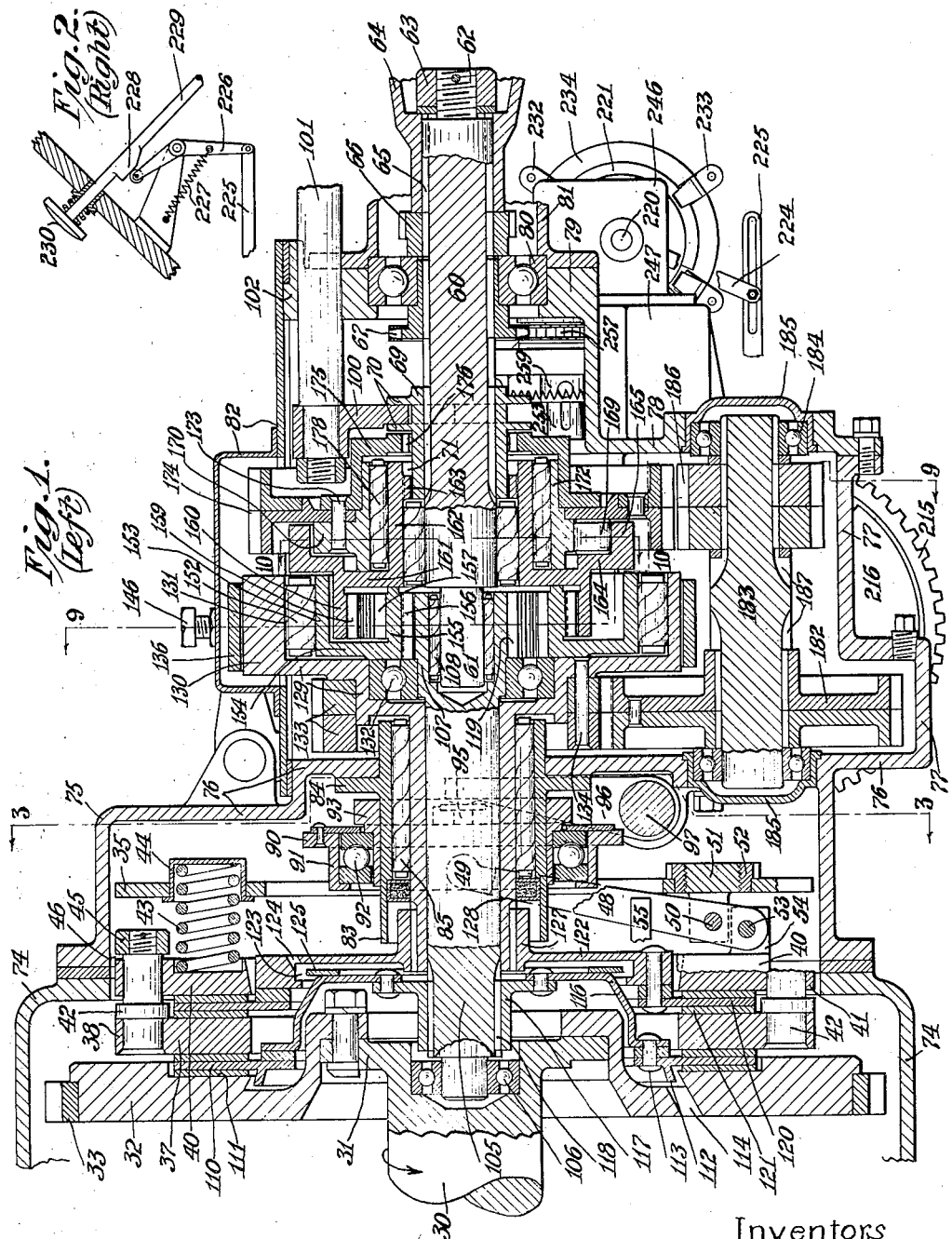

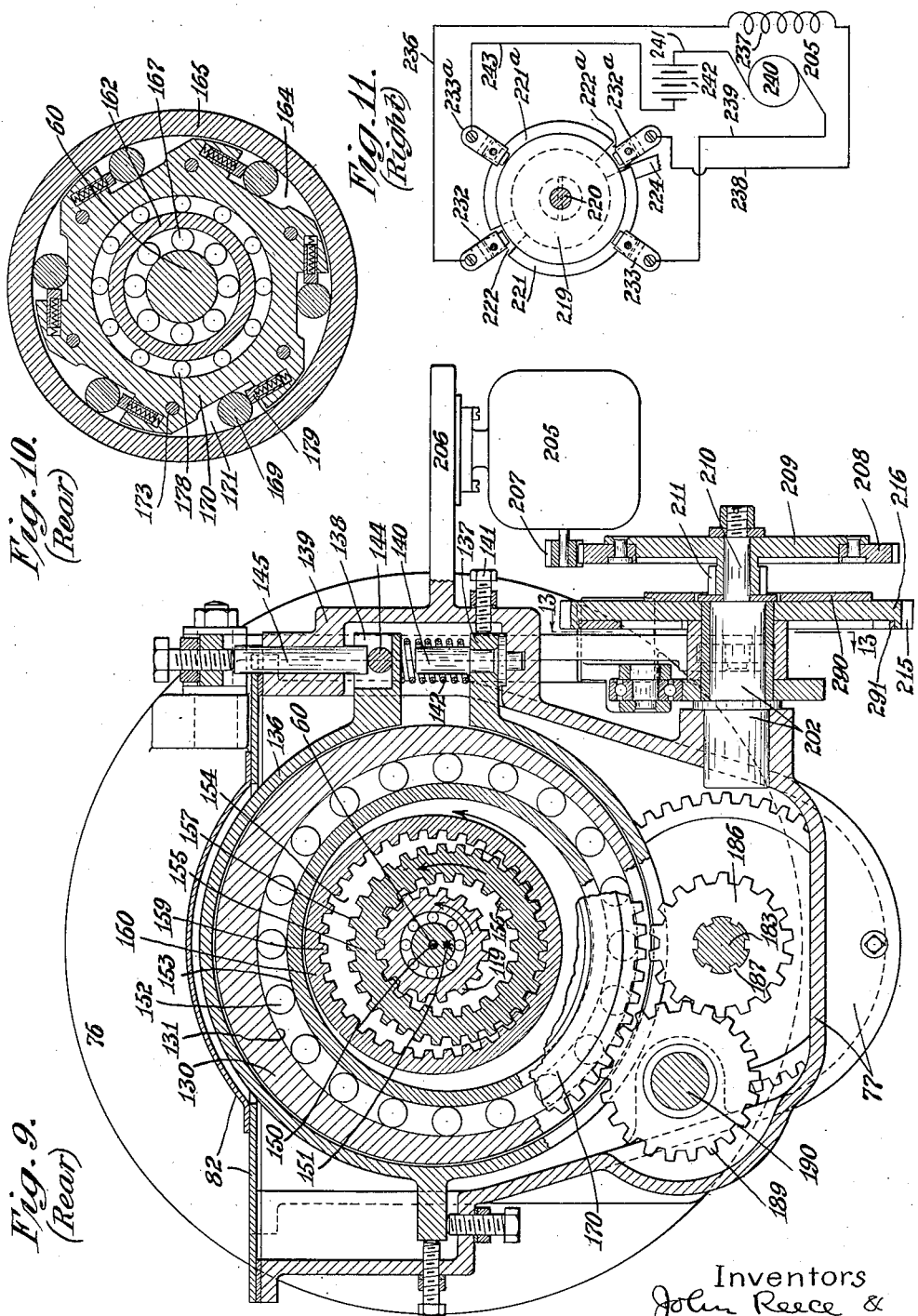

April 12, 1932.  J. REECE ET AL  1,853,454
POWER TRANSMISSION
Filed Aug. 14, 1930   6 Sheets-Sheet 4
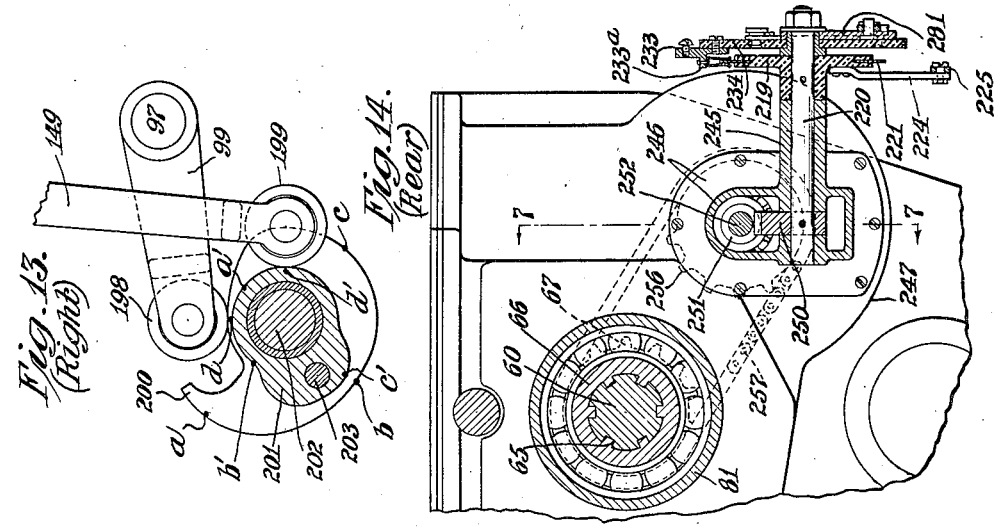
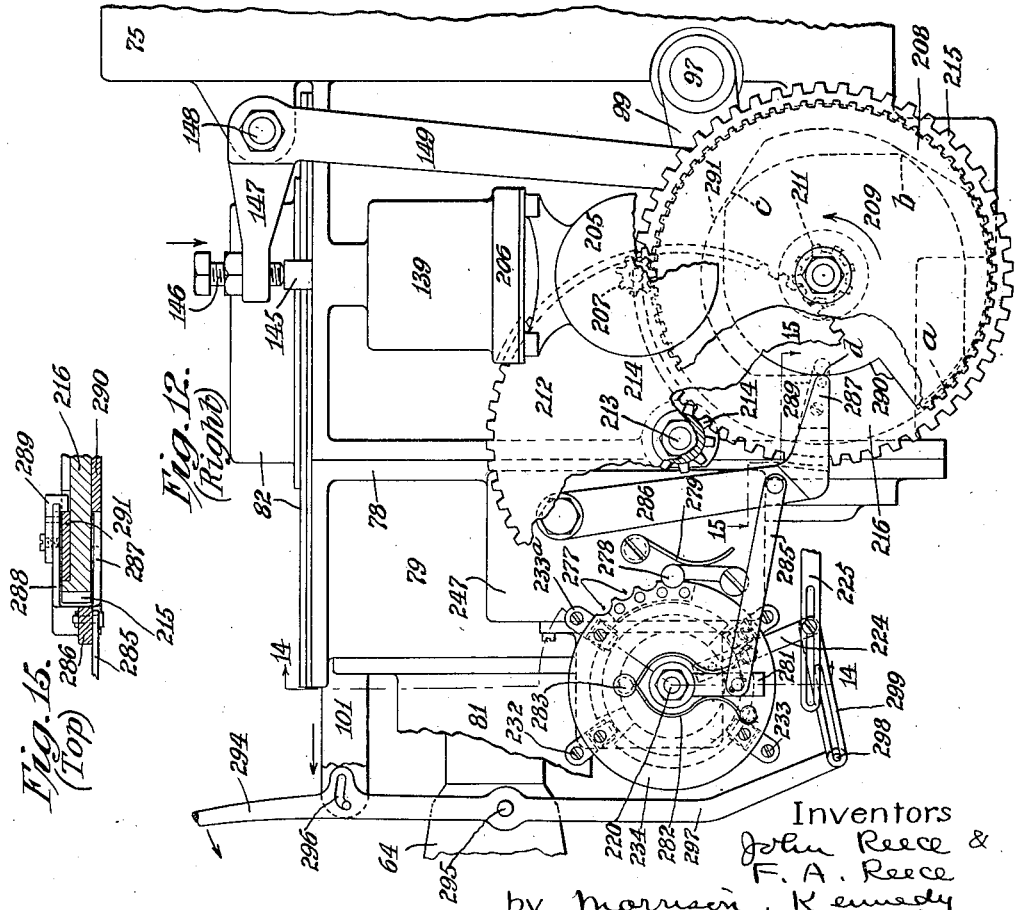
Inventors
John Reece &
F. A. Reece
by Morrison, Kennedy
& Campbell, Attys.

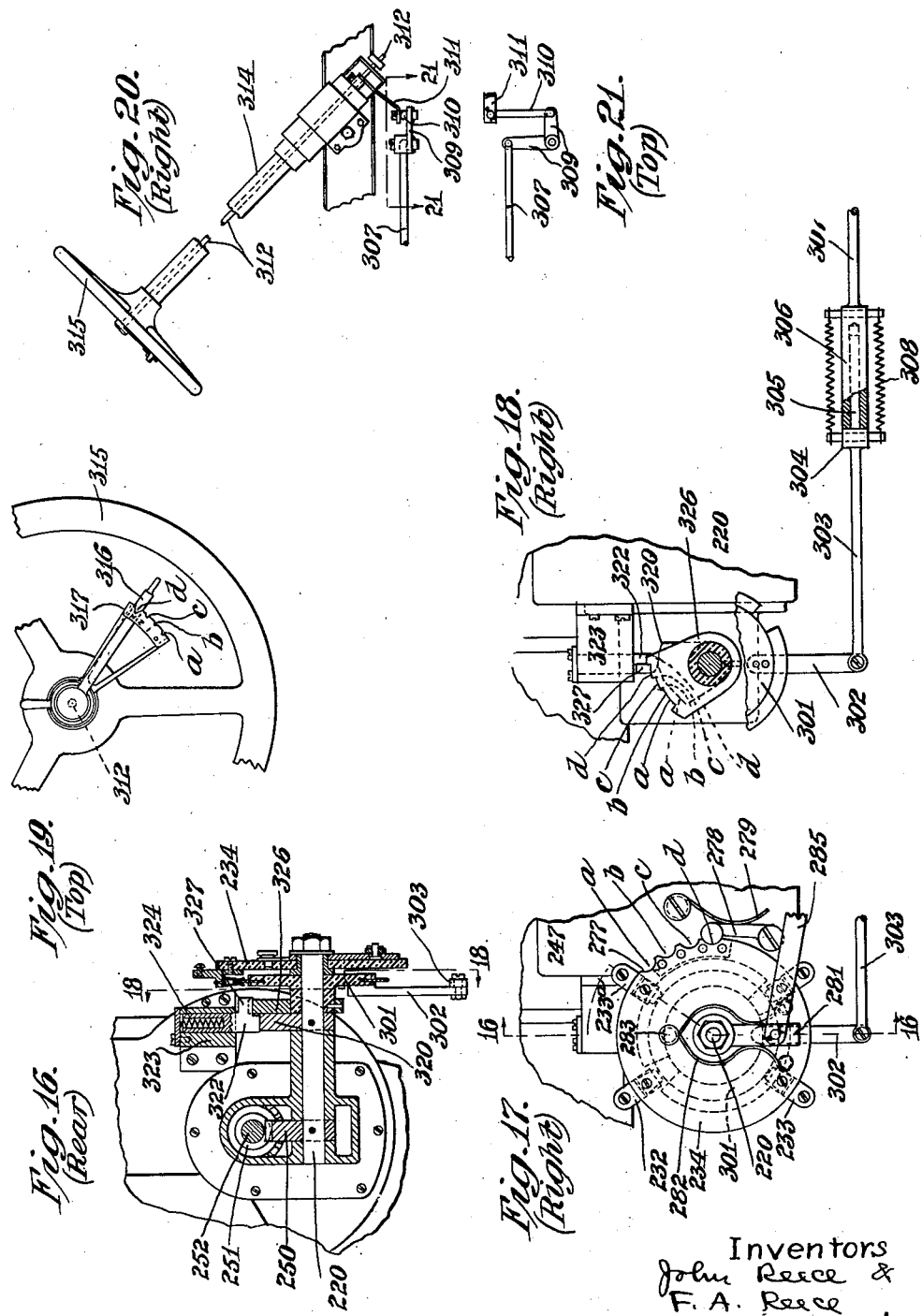

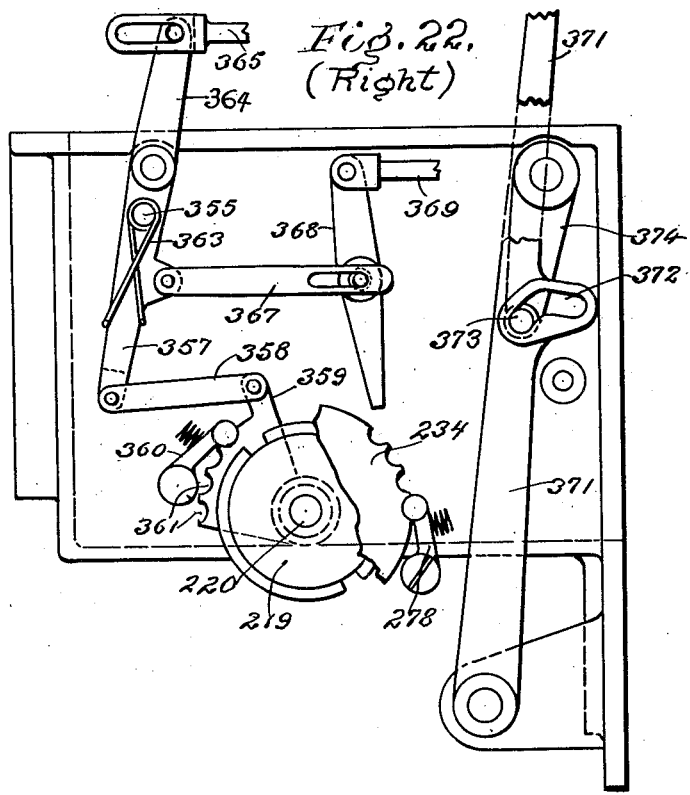
Fig. 22. (Right)
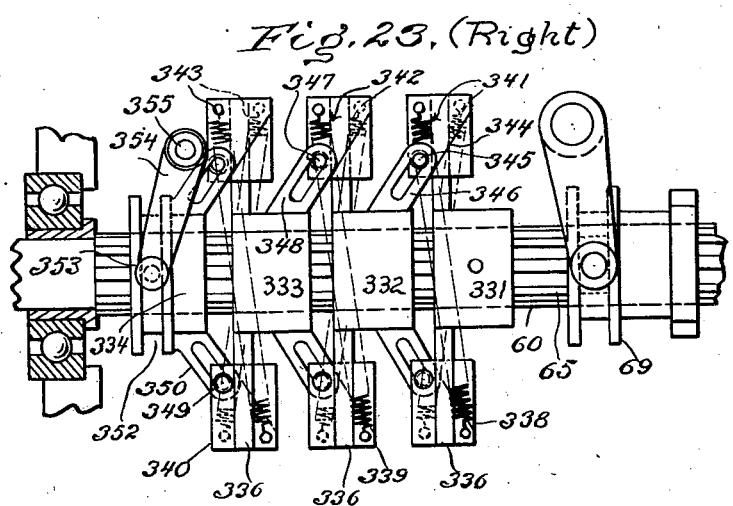
Fig. 23. (Right)

Patented Apr. 12, 1932

1,853,454

UNITED STATES PATENT OFFICE

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE

POWER TRANSMISSION

Application filed August 14, 1930. Serial No. 475,204.

This invention relates to power transmission, and involves a novel apparatus for the mechanical transmission of power from a driving shaft, representative of any source of power, to a driven shaft, representing any sort of load, in a variable manner, or to afford adjustments of speed ratio between the driving and driven shafts or members. A typical purpose for which the invention is useful is for the transmission from the engine to the wheels of a motor vehicle, wherein the load is variable and the speed ratio and torque should vary to correspond.

The general object of the present invention is to afford means of power transmission adapted to meet the requirements referred to with efficiency and smoothness of operation, with convenience of control, and compactness and strength of structure. A particular object hereof is to afford ease of shift from one driving condition or adjustment to another, particularly between the so-called low speed and high speed forward drives, and preferably an intermediate or second speed, in addition to a non-driving adjustment or a zero speed condition.

A further object is to afford a transmission of the kind referred to wherein after the manual initiation of transmission and drive the adjustment as between the several driving conditions may be automatic or semi-automatic; particularly in that, when drive has been initiated at slow speed (or high ratio), the increase of speed (or ratio decrease) may be automatically effected up to the highest speed, which usually will involve a ratio of one to one, without internal play of the gearing. The control referred to, for example may be according to the speed of the vehicle itself, so that the faster the vehicle travels the lower will be the mechanical speed ratio from the driving to the driven parts.

In the preferred embodiment illustrated herein it is an object to render the speed shifting semi-automatic by imposing manual control thereover to a partial extent, especially by leaving it entirely to the operator to reduce the driven speed (or increase the ratio) by a controller element which may be shifted from high to second, or second to first, or first to zero at will, thereby not merely altering the transmission conditions as described, but imposing a desired speed limit on the automatic control.

A further object is to provide a simple and practical means of affording reverse direction of drive at slow speed or high ratio at will.

Other and further objects and advantages of the present invention will be explained in the hereinafter following description of an illustrative embodiment thereof or will be understood to those conversant with the subject. To the attainment of the aforesaid objects and advantages the present invention consists in the novel power transmission apparatus and the novel features of combination, operation, arrangement and structure herein illustrated or described.

In the accompanying drawings, Fig. 1 is a central longitudinal vertical section of a power transmission mechanism embodying the present invention, taken on the section line 1—1 of Fig. 3, the parts which are in elevation being viewed in what may be termed left elevation, since the section is taken looking from the left side of the vehicle, the engine shaft appearing at the left end of the figure. Fig. 2 is a vertical fore-and-aft section, looking from the right, showing an accelerator or throttle control pedal, supplemented by a device for initiating the operation of the present invention.

Fig. 3 is a transverse section, looking from the rear, taken on the section line 3—3 of Fig. 1. Fig. 4 is an inclined section view of a detail of construction taken on the section line 4—4 of Fig. 3. Fig. 5 shows a detail of the speed governor or centrifuge taken on the section line 5—5 of Fig. 6, certain parts seen in top view. Fig. 6 is a front elevation, partly in section on the line 6—6 of Fig. 7 of the governor or centrifuge. Fig. 7 is a fore-and-aft section taken on the line 7—7 of Fig. 14, certain parts seen in right elevation, showing the arrangement and connections of the governor or centrifuge. Fig. 8 is a detail section view taken on the line 8—8 of Fig. 7, looking from the front.

Fig. 9 is a transverse section, looking from the rear, taken on the section line 9—9 of Fig. 10

1. Fig. 10 is a similar transverse section looking from the rear taken on the section line 10—10 of Fig. 1. Fig. 11 is a diagrammatic view of the control switch and wiring diagram seen in right elevation.

Fig. 12 is an exterior right elevation of the assembled apparatus, with certain parts broken away to show other parts. Fig. 13, in similar right elevation, and partly in section on the line 13—13 of Fig. 9 shows the details of the shaft controlling cams and followers. Fig. 14 is a view partly in rear elevation and partly in section on the line 14—14 of Fig. 12. Fig. 15 is a horizontal section view looking from above taken on the line 15—15 of Fig. 12.

Figs. 16 to 21, in connection with the other figures, illustrates a modified control arrangement, Fig. 16 constituting a rear elevation and section on the line 16—16 of Fig. 17. Fig. 17 is a right elevation of the modified switch and surrounding mechanism. Fig. 18 is a right elevation and vertical section on the line 18—18 of Fig. 16. Fig. 19 is an inclined plan view of the steering wheel of a vehicle with a control means added according to the present invention. Fig. 20 is a right elevation of the steering wheel and column and control connections at the foot of the latter. Fig. 21 is a detail plan view taken on the line 21—21 of Fig. 20.

Fig. 22 is a right elevation of certain control parts in modified form, but including certain parts shown in the corresponding views Figs. 11, 12 and 17.

Fig. 23 is a right elevation of the modified governor, located in this embodiment directly upon the driven shaft and beyond the parts shown in Fig. 22.

Generally speaking the parts are shown set for high speed forward drive, that is transmission at the lowest or unitary ratio. For convenience the driving or power parts of the apparatus will first be described, then the driven parts, then certain stationary frame or casing parts, and thereafter the transmitting mechanisms for the several driving adjustments, including the reverse drive, and finally the manual and automatic control for effecting the desired shifts of speed or ratio.

The driving parts are shown in Figs. 1, 3 and 4. At the extreme front is shown the shaft 30 which usually will be the crank shaft of the vehicle engine, of the internal combustion type. The rear end of the shaft is enlarged into a head 31 to which the rotary support or disk 32 is bolted, this with parts carried by it constituting substantially the fly wheel of the engine and fitting within the same space as occupied by the usual fly wheel. The periphery of the fly wheel or driving member 32 is shown provided with gear teeth 33 which may be the teeth cooperating with a self starting device. Spaced to the rear of the driving disk 32 and connected by a system of six studs or bolts 34 is shown a ring or flat disk 35 held rigidly to the driving disk by the studs and confining nuts 36. These elements 30 to 36 constitute substantially the rigidly connected parts of the fly wheel, but certain relatively movable parts are carried with these and will next be described.

A pressure ring 37 is shown, concentrically arranged, and facing the driving disk 32. This ring is for the purpose of applying clutching pressure to certain parts between it and the driving disk, as will be described. It is formed with a series of six peripheral projections 38 having apertures engaging the studs 34, and other apertures engaging other studs to be described. By this arrangement the pressure ring 37 is slidable axially upon the studs 34, and strong pressure springs 39 are shown confined between rings 35 and 37 and forcing the latter into clutching position, as best shown in Fig. 4.

A second pressure ring 40 is shown having peripheral projections 41 slidingly engaging upon a system of six studs 42 which extend merely from one pressure ring to the other. For example, the studs are shown rigidly secured to ring 37, and engaging slidingly the ring 40. In order to thrust forwardly the second pressure rings 40, to effect certain clutching actions between it and the pressure ring 37, there are shown a system of springs 43 extending between the ring 40 and the ring 35, the latter having sockets 44 to accommodate the rear ends of the springs. In order to limit the relative movement of pressure ring 40 away from ring 37 the studs 42 are shown as having threaded reduced portions at the rear ends engaged by stop nuts 45, in such relation that a gap 46 is left between the ring 40 and the nuts. This permits the ring 40 to slide rearwardly on the studs sufficiently to disengage the clutch located between the two pressure rings. As clear in Fig. 1 there is also a gap between the pressure ring 40 and the central collar of the stud 42, so that the clutching movement of the ring will not be interfered with by the collar.

The clutch comprising the disk 32, ring 37 and member between them may be considered the low speed clutch while that comprising rings 37 and 40 and the member between them may be considered the high speed clutch. As will appear, when high speed drive is in effect, both clutches will be engaged or closed, while at low speed only the low speed clutch will be engaged. Second speed involves the engagement of the low speed clutch with certain other adjustments elsewhere. Opening both clutches entirely uncouples the engine from the vehicle wheels. A part of the means for opening the second or high speed clutch only, or for opening both clutches, will now be described, so far as these parts are carried around with the driving disk 32.

A system of six clutch opening levers 48 is indicated, each of these extending inclinedly inwardly to where they carry contact heads 49 adapted to be thrust axially by non-rotating means to be described. Each of the six clutch levers is shown as fulcrumed upon a lug 50 extending forwardly from the driving ring 35. For adjustment purposes the lug 50 is shown as formed on a threaded plug 51 which is engaged by an adjusting nut 52 fitted within an aperture in the driving ring and having a rear flange overlying the ring to hold the parts in position. The turning of the nut 52 changes the position of the fulcrums of the levers and permits correct initial adjustment.

Each clutch lever 48 is shown also pivoted at 53 to a lug 54 extending rearwardly from the second or high speed pressure ring 40. By this arrangement each lever may be swung about its fulcrum 50, and this swinging movement may be guided by a lug 55 extending rearwardly from the pressure ring alongside each lever.

By this mechanism when the lever heads 49 are thrust forwardly to a moderate extent the pressure ring 40 will be pulled rearwardly against the pressure of its springs 43. This effects the unclutching of the high speed clutch. The ring slides on the six studs 42, and the sliding movement ceases when the ring comes in contact with the stop nuts 45. If now the clutch lever heads are thrust still further forward the ring 40 will be drawn further rearward. Due to the engagement of the ring with the stop nuts the studs 42 will be pulled rearward and thereby the low speed pressure ring 37 will be drawn rearward against the pressure of its springs 39. At the end of this movement both clutches are effectively disengaged and the engine runs free. Letting the clutch levers return by steps to the high speed position as shown in Fig. 1 causes first the engagement of the low speed clutch and with further movement the engagement of the high speed clutch.

The driven parts include mainly the driven shaft or member 60 arranged preferably in alinement with the driving shaft, but with an intermediate shaft between them as will be described. The front end 61 of the driven shaft is of reduced diameter to accommodate a roller bearing. The rear end of the shaft is threaded at 62 to receive a confining nut 63. The nut 63 bears against a shoulder of a member 64 which is representative of any connection or universal joint between the driven shaft and the usual propeller shaft or other mechanical device extending to the vehicle wheels. The member 64 is shown as mounted upon the driven shaft through keyways 65 in the latter as indicated in Figs. 1 and 14. A gear 66 is similarly keyed upon the driven shaft and confined in front of the member 64, and in front of the gear is a sprocket wheel 67, the hub of which may be pinned against longitudinal movement on the shaft.

Further forward on the driven shaft, and slidable thereon in the keyways 65, is a shiftable sleeve 69, shown in its forward position, giving forward drive, but adapted to be shifted rearwardly to reverse the direction of drive. The sleeve 69 is shown as having a pair of flanges 70 forming a groove engaged by the reverse shifting means to be described. Near its forward end the sleeve 69 is formed with outer teeth 71, these constituting a clutch through which the power is delivered to the driven shaft whether at high, second or low speeds or reverse.

The frame or casing parts include the following, and others which will be referred to later in connection with specific parts of the mechanism with which they cooperate. Surrounding the front end of the transmission is a stationary housing 74 of cylindrical shape which may represent the housing ordinarily used to enclose the fly wheel. The rear end of the housing 74 is curved inwardly to a smaller diameter and there has attached to it a removable housing 75 also of generally cylindrical shape. This in turn is formed at its rearward portion into inwardly extending walls 76, the lower portions of which are extended rearwardly as walls 77 enclosing the lower side of the transmission and affording space for the counter shaft to be described. At the rear end of the wall 77 there is shown attached an inwardly extending wall 78 which again is shaped rearwardly into a cylindrical wall having an enlargement or head 79. Between the stationary head 79 and the driven shaft is shown a ball bearing 80. Attached to the head 79 and extending rearwardly therefrom is indicated a cylindrical extension wall 81 which may enclose the universal joint 64 and parts to the rear thereof as may be desirable. The top side of the housing portion enclosed by the walls 76, 77, 78 and 79 may be open for assembling and access, but closed by a removable cover 82 having an upward enlargement to accommodate certain parts as clearly shown in Figs. 1, 9 and 12. The concentric inner part of the walls 76 is shown as having attached to it a fixed sleeve 83, the flange 84 of the sleeve being secured to the wall. Between the sleeve and the parts inwardly thereof is shown a roller bearing 85 by which the concentric relation of the parts is maintained.

The clutch shifting means for the first or low speed clutch and the second or high speed clutch already described may be arranged for example as follows. The rounded and hardened ends or heads 49 of the clutch opening levers 48 are shown as adapted to be contacted by a flange 90 formed upon a ring 91 enclosing between its forward and rearward parts a thrust bearing 92 surrounding a sleeve 93 slidably arranged upon the fixed sleeve 83. As shown in Fig. 1 the ring 91 and its flange 90 are in their rearward position, with the flange out of contact with the lever heads, so that the two sets of springs 39 and 43 take effect to close both clutches.

In order to open one or both of the clutches means is shown for thrusting the sleeve 93 and ring 91 forwardly. Thus as best shown in Fig. 3 the enlarged part of sliding sleeve 93 is formed with outstanding ears 94 which are perforated to receive the thrusting parts or pins 95 of a pair of lever arms 96 extending, like a yoke, from a shaft 97 mounted in the lower part of the housing in bearings 98. By this arrangement the sleeve 93 may be caused to slide forwardly and allowed to return rearwardly, but does not rotate, while the thrusting ring 91 is moved with the sliding sleeve, but capable of rotation while operating upon the clutch levers 48, due to the thrust bearings 92 between the ring and the sleeve. The shaft 97 may carry an operating arm 99, seen in Figs. 3, 12 and 13.

It is therefore merely necessary to turn the shaft 97 carrying the yoke arm 96, in order to thrust forwardly the sleeve 93 and ring 91 to operate the clutch levers to open the high speed clutch or to open both clutches in accordance with the extent of movement. This turning of the shaft 97 may be effected in various ways, for example by manual or pedal actuation, but as will be subsequently described it may also be actuated through automatic or semi-automatic control.

It will be convenient to complete the description of the transmission itself, as shown on Figs. 1, 3, 4, 9 and 10 before taking up the means of control thereof. Referring next to the reversing sleeve 69 this is shown as shiftable from its frontward position to its rearward position through the flanges 70 of the sleeve, forming a circumferential groove which is engaged by a stud or head 100 mounted at the forward end of a sliding rod 101 mounted in an upward extension 102 of the housing enlargement 79. The rod 101 may be slid forwardly or rearwardly manually or otherwise in connection with shifting the transmission from forward to reverse drive, as will be subsequently described.

Next will be described the mechanism intermediate the driving parts and the driven shaft for communicating low speed drive to the latter when the second or high speed clutch is open, and the further mechanism for converting the transmission between low speed and second speed, while the clutches are in this condition. The parts between the driving and driven shafts include several rotary parts, preferably concentric with the axis of rotation of the driving and driven shafts. One of these parts may be described as a central intermediate shaft 105 as it is preferably a solid shaft and extends in axial alinement with the driving and driven shafts 30 and 60, with a ball bearing 106 between the driving and intermediate shafts, and at the rear of the intermediate shaft a hollow enlargement 107 with a roller bearing 108 between it and the driven shaft.

The intermediate shaft 105 is connected with the low speed clutch and takes part in the transmission of drive at all speeds and reverse. The low speed clutch may be described as consisting of the driving disk 32 and opposed to it the pressure ring 37, with a clutch annulus 110 between them, and preferably a friction disk or washer 111 at each side of the clutch annulus. Near its inner edge the clutch annulus 110 is formed with a forward flange 112 projecting into an annular recess 113 in the driving disk 32, so as to prevent oil reaching the clutch parts, the oil passing forwardly through inclined holes 114 for delivery into the housing 74.

The inner part of the clutch annulus 110 is shown as attached to a dished web 116, the inner end of which in turn is attached to a sleeve 117 slidingly secured on the intermediate shaft 105 by keyways 118 in the latter. By this arrangement the clutch annulus 110 and intermediate shaft 105 are compelled to rotate together, while the annulus is permitted to shift slightly axially with the opening and closing of the clutch 32, 110, 37. The other or rear end of the intermediate shaft 105, namely around the enlargement 107, is shown formed with teeth 119 by which the connections of the intermediate shaft, yet to be described, are made.

The second or high speed clutch may be considered as comprising the pressure rings 37 and 40 and a clutch annulus 120 between them, with friction disk or washer 121 at each side thereof. When the springs 43 are in effect these three clutch parts are frictionally clutched together. The clutch annulus 120 is secured at the outer part of an offset web 122 which is formed with an oil recess 123 and delivery passage 124 to protect the clutch, in connection with a flange 125 on the web, from access of oil.

The hub 127 of the web 122 is shown engaged by key with an intermediate sleeve 128 in the nature of a hollow shaft, surrounding the intermediate shaft 105. At its rear end the intermediate sleeve is formed with a web 129 which extends first transversely outward and then cylindrically rearward and then transversely outward to a cylindrical member, drum or head 130 adapted to be held stationary at certain times, and constituting a bearing for certain parts enclosed within it, the head 130 having an eccentric recess 131 operating as will be described. Between the web 129 of the sleeve and the intermediate shaft 105 is shown a ball bearing 132. Also, at the forward side of the web is shown a gear 133 which is preferably a herringbone gear, attached by pins 134, and adapted to engage and drive a complementary gear on a counter shaft yet to be described.

The drum 130 normally runs free or idle, but for the purposes of second speed drive is to be anchored or held stationary, so as to constitute a stationary bearing for the parts within it, being thus the equivalent of an axle centered at the eccentric point about which its recess 131 is described. For the purpose of anchoring or holding the drum 130 it is shown as surrounded by a braking strap or shoe 136, seen in Figs. 1 and 9, the ends of the strap having lower and upper heads 137 and 138 accommodated within a leftward extension 139 of the housing. The lower strap head is shown as perforated to receive a pin 140, the bottom end of which is dropped into a recess in the fixed wall, and a screw 141 and lock nut being employed to hold the head against displacement. Surrounding the pin 140 and extending between the two strap heads is a compression spring 142 tending to separate the heads by forcing upwardly the upper head, thus normally removing the strap and leaving the drum free.

For the purpose of depressing the upper strap head against the resistance of the spring to tighten the strap around the drum, the head is shown recessed to receive a contact piece or sphere 144 upon which bears the lower ends of a vertical thrust pin 145 sliding in a part of the fixed housing and with its upper end projecting to an accessible point above the housing, as indicated also in Fig. 12. For the purpose of depressing the pin 145 there is shown an adjustable contact member or screw 146 mounted upon the short horizontal arm 147 of a bell crank lever fulcrumed at 148 on fixed brackets and having its long arm 149 extending downwardly to an operating point. This may be considered the operating arm of the brake strap, since if this arm is pulled forwardly, or to the right in Fig. 12, it causes the thrusting down of the pin 145 and strap head 138 to tighten the strap and anchor the drum 130, thus applying second speed drive. This control may be effected by pedal or otherwise manually, but preferably is performed automatically or semi-automatically as will be subsequently described. The arm 149 is seen also in Fig. 13.

Next will be described the transmitting parts extending to the driven shaft 60 from the intermediate shaft 105 and intermediate sleeve 128, the former of which has been described as far as its rear head 107 having exterior teeth 119, and the latter having been described as far as its rear head or drum 130 having eccentric recess 131. As already indicated, when both the first and second clutches are open the intermediate parts 105 and 128 are free, and there is no drive. The first clutch is closed for all drive conditions. When both the clutches are closed the intermediate parts turn together with the result that the connections yet to be described will turn substantially as a unit with the intermediate parts thus effectively coupling the driven shaft to the driving shaft for silent full speed drive. When, however, the second clutch is open and the first clutch is closed the intermediate sleeve 128 is not turned with the driving parts, and may either run free, in which case low speed drive is transmitted, or may be anchored by the brake strap 136 applied to the drum 130, in which case the gearing to be described will deliver second speed drive.

Referring particularly to Figs. 1, 9 and 10 the drum or head 130 of the intermediate sleeve 128 has the eccentric recess 131 already referred to. Designating by 150 the general axis, the center of eccentricity of the recess is designated 151 on Fig. 9. Running against the interior of the drum are a series of rollers 152 constituting a bearing of which the drum is the outer race, the inner race consisting of a ring or flange 153, which of course is also eccentric. The ring 153 is shown formed with an inwardly extending web 154 having at its inner point a second flange or ring 155, carrying inner gear teeth 156 and outer gear teeth 157. The inner gear teeth constitute an internal gear engaging at one side with the teeth of the central gear 119 of the intermediate shaft. There will be play between the gears 119 and 156 except at high speed drive.

To complete the internal-external gear combination there is shown an internal gear 159 formed within a ring or flange 160 connected as will be described. The gear 159 is concentric with the central axis of the transmission and at one side meshes with the external teeth 157 of the gear ring 155, namely at the side opposite to the engagement of the internal teeth 156 with the central gear 119. This gear combination permits a double speed reduction between the intermediate shaft 105 and the ring 160 and parts therebeyond, such reduction being sufficient for second speed purposes, and being obtained by a gearing which is very compact, being contained entirely within the drum 130, and which is efficient, silent and durable.

Describing the further connections of the reduction gearing, the gear ring 160 is shown as extending forwardly from a web 161 which web extends outwardly from a rotary sleeve 162 carrying, near its rear end, inwardly extending clutch teeth 163 engageable by, and shown in Fig. 1 as engaged with, the clutch teeth 71 of the shiftable driven shaft sleeve 69. The web 161 is shown as having an outward extension 164 with a rim or clutch ring 165 extending rearwardly at the periphery thereof, for cooperation with parts to be described in effecting slow drive. The described elements 159 to 165 are shown as a single rigid or integral member, and between the sleeve 162 and the driven shaft is shown a roller bearing 167 assisting to keep the parts in their correct concentric position.

The clutch rim 165 of the united concentric elements 159—165 is arranged as one member of a one-way drive device or overrunning clutch embodying a number of rolling elements or wedges 169 as seen in Figs. 1 and 10, six of them being shown, confined between the clutch rim 165 and an inside clutch member 170 having tapered recesses 171 in which the rollers are adapted to be wedged when the clutch member 170 is turning counterclockwise in Fig. 10 and the clutch rim 165 is not overrunning or turning at a higher speed. This one-way drive device takes part in the low speed drive as will be explained, yet permits the driven parts to overrun when second speed is engaged. The clutch member 170 is shown formed with a sleeve 172, concentric with the driven parts. By means of pins or rivets 173 the clutch member is attached to a gear 174, preferably of the herringbone type. The web of the gear has an inward extension 175 provided with clutch teeth 176, adapted to be engaged by the teeth 71 on the driven shaft sliding sleeve 69, for reverse driving purposes, the latter however shown in Fig. 1 out of engagement therewith. The described parts 170 to 176 constitute a substantially unitary member concentrically arranged, and a roller bearing 178 is shown interposed between the sleeve 172 and the sleeve 162 already described. Each of the clutch rollers 169 may be provided with a spring pressed device 179 tending to press each roller into clutching engagement, as is usual with this type of clutch.

In order to communicate rotary motion to the united elements 170 to 176 for slow drive and for reverse drive purposes the following connections may be employed. The herringbone gear 133 attached to the web of the intermediate sleeve 128 is shown engaging with a complemental herringbone gear 182 mounted on a counter shaft 183 rotating in ball bearings 184 mounted in special housing members 185 in the walls 76 and 78 respectively. By this means the counter shaft 183 is maintained in rotation. It should be explained that when both the first and second clutches are closed the intermediate sleeve 128 turns forwardly, or counterclockwise in Figs. 3, 9 and 10, at the full driving speed, thus transmitting a reverse or clockwise rotation to the counter shaft 183, which will be substantially the same speed as that of the driving shaft, although its speed could be reduced if desired by employing a gear 182 of larger diameter than the gear 133. When however the second clutch is open, and the drum 130 is not anchored by the brake band, the drum and the intermediate sleeve 128 and the gear 133 will be free, so far as transmitting high or second speed drive is concerned, but will be rotated positively in a reverse or clockwise direction, thus communicating forward or counterclockwise rotation to the counter shaft, for the purposes of low speed drive.

At the rear end of the counter shaft 183 is a second and smaller gear 186 which is preferably a herringbone gear and rotates in the same plane with the gear 174 already described. The two gears 182 and 186 are fast on the counter shaft which is formed with keyways 187 for this purpose. The small diameter gear 186 on the counter shaft does not engage directly the gear 174, but as best seen in Fig. 9 engages an idler gear 189 turning loosely on an axle 190 and meshing with the gear 170.

By this arrangement of gearing, including the counter gears, a slow forward rotation is given to the inner clutch member of the one-way device for low speed purposes, while a reverse direction of rotation, also at low speed, is given to these parts and the clutch teeth 176, when the first and second main clutches are engaged, for reverse drive purposes. The united elements 170—176 turn always in the same direction as the counter shaft due to the interposed idler 189.

The operation of the gearing so far described will now be referred to. As already stated, when the two main clutches are open, there will be no transmission or drive, and the vehicle will run free. Also when both main clutches are closed there will be high speed drive, the driving, driven and intermediate parts all turning as a unit, without internal play. This is due to the fact that the intermediate shaft 105 and sleeve 128, being both coupled to the driving shaft 30, are in effect coupled to each other, so that the gear systems commencing with the drum or bearing head 130 and the central gear 119 are prevented from internal play, the entire system becoming internally rigid and rotating with the intermediate parts and driving shaft and thereby, through the clutch engagement 71, 163, turning the driven shaft at the full driving shaft speed. The unitary parts 170 to 176 may turn idly independently of the other parts, due to engagement with the gears on the counter shaft, but without effect.

The remaining driving conditions to be described are the low speed forward, second speed forward, and the low speed reverse. It will be convenient to commence with the second speed forward drive, put into effect by tightening the brake band or shoe 136 so as stationarily to hold and anchor the drum or head 130 having the eccentric recess 131 within which the unitary system 151—157 rotates. Of the unitary parts mentioned the gear ring 155 with its interior teeth 156 and exterior teeth 157 is the active part, this double gear rotating about the eccentric axis 151. The head 130 therefore is the equivalent of any eccentric shaft, carried by the intermediate sleeve 128, on which the double gear turns about the axis 151. Normally the bearing head 130 and the eccentric axis 151 will be in a floating condition, due to the rotary character of the sleeve 128, but under the assumed conditions the bearing head 130 and therefore the axis 151 are maintained stationary, for example in the position shown in Fig. 9, the eccentric axis being directly below the concentric or main axis 150 of the system.

Under second speed conditions the intermediate shaft 105 is turning counterclockwise or forwardly with the driving shaft. Its rear end or head 107 carries the gear 119 which partakes of the forward rotation. This central gear 119 engages the internal gear 156 at a driving point opposite to the eccentric axis on which the gear 156 turns. Due to the difference in diameters the larger gear 156 turns at a lower angular speed than the central gear 119. The external gear 157 is unitary with the gear 156 and therefore also is eccentric. The gear 157 engages the internal gear 159 constituting part of the unitary system 159—165. As seen in Fig. 9 the engagement will be opposite to the engagement between the gears 119 and 156. Owing to the difference in size between gears 157 and 159 the latter will be driven at reduced speed.

The described gearing therefore is the equivalent of a reduction gearing through a counter shaft, and delivers forward drive to the united parts 159—165 at an angular speed substantially reduced from the driving shaft speed, and therefore with a proportionately greater torque. The clutch teeth 163 being at this time engaged with the clutch teeth 71 of the driven shaft, the latter partakes of the reduced speed drive, which is sufficiently lower than the high speed drive to constitute a practical second speed for motor vehicle purposes.

It may be convenient here to state the speed ratios afforded by the disclosed mechanism when constructed in the proportions shown. At high the ratio is of course 1 to 1. The second speed is at the ratio of 1.5 to 1, giving a torque 50% greater than high speed. The low speed, yet to be described, affords a ratio of 3 to 1, with torque of triple the normal extent. The reverse drive is approximately 3.2 to 1 ratio.

Coming to low speed drive, the shoe or strap 136 is to be loosened so that the drum or bearing head 130 may run free. The second main clutch is open, leaving the drive to be communicated from the driving shaft through the first main clutch and through the intermediate shaft 105 and central gear 119 carried thereby. The parts otherwise will be in position as shown in the drawings.

Perhaps the best way to consider the low speed drive is first to assume that the driven shaft 60 is held against rotation. This holds stationarily the unitary system 159—165, although of course as the driven shaft yields to the low speed drive these parts will turn slowly forward. Referring to Fig. 9, and continuing the assumption that the concentric gear 159 remains stationary with the driven shaft, the power turning of the central gear 119 will cause the rotation of the eccentric double gear 156—157, the outer teeth of which therefore will advance or creep around the teeth of the fixed internal gear 159. This necessarily results in a bodily shift of the double gear as it rolls progressively around its orbit, with the result that the axis 151 is compelled to planetate about the main axis 150, namely in a clockwise or relatively reverse direction. This axis 151 is merely the center determined by the eccentrically recessed bearing head 130, which in this adjustment is free, and is therefore compelled, by the described gear motions, to turn clockwise or reversely, thus carrying with it the intermediate sleeve 128 and the herringbone gear 133.

In other words, during slow speed drive, the sleeve 128 and gear 133 are compelled to turn reversely to their usual rotation. The gear 133 therefore turns the gear 182 and counter shaft 183 and the rear gear 186 oppositely to their usual motion. The idler gear 189 therefore operates to transmit forward drive to the gear 174 constituting part of the unitary system 170—176.

This speed obviously will be much slower than the full driving speed, in fact, with the proportion shown, about one third of the full speed. The drive is communicated from the clutch member 170 through the wedging rollers 169 to the surrounding clutch member 165 which, as first described, is now substantially a part of the driven shaft. The driven shaft is thereby compelled to partake of the slow forward rotation as transmitted through the countershaft and clutch member 170. At the same time the arrangement is such that the drive is in forward direction only, and there is no positive coupling. In other words the driven shaft and parts turning with it may at any time be taken away from the low speed connections, as for instance when the second speed drive is put into effect, when the clutch member 165 will be caused to overrun the wedging rollers and slow turning clutch member 170.

The change between slow and second speeds therefore is very easily, smoothly and quietly effected, namely by tightening the brake strap 136 frictionally upon the drum 130 to secure second speed, overrunning the slow speed, and merely loosening again the brake strap, allowing the driven speed to fall off until the one-way device or slow clutch again takes effect.

A connection may be made from the brake lever or pedal of the vehicle to the main clutches, to open them, and thus discontinue transmission whenever the brake is applied.

The reverse drive may be effected by first shifting the driven shaft sleeve 69 so that its clutch teeth 71 will disengage the teeth 163 and will engage the teeth 176 of the unitary system 170—176, followed by a closing of both main clutches. When this adjustment is attained the herringbone gear 133 will turn forwardly at full speed, as described, thus turning the counter shaft reversely at full speed and turning the unitary system 170—176 reversely at reduced speed, in the ratio of 3.2 to 1, this reverse drive being communicated directly to the driven shaft through the clutch teeth 176 and 71.

While the shifts of drive may be independently effected by manual or pedal means, through the operating arm 99 and shaft 77 to control the first and second main clutches, and through the operating arm 149 to control the braking of drum 130, and through the rod 101 to control the shift from forward to reverse, there is herein shown means for automatically or semi-automatically effecting the shifts in proper coordination, so that one condition will be discontinued in the applying of another condition. In the principal embodiment, Figs. 1 to 15, the drive is required to be initiated manually, which term is intended to include pedal or the like, and thereafter is automatic both as to increase of driven speed (and reduced ratio) as the speed of the vehicle increases, and the reduction of driven speed (with increased ratio and torque) as the vehicle slows down; while in Figs. 16 to 21 are shown modifications whereby manual control may be imposed upon the automatic shifting of conditions.

The actual shift between high, second, low and zero speeds is shown as effected by controlled movements of the control arms 99 and 149 connected respectively with the main clutches and with the drum brake. Fig. 12 shows the relation of the control arms, and the parts not therein shown are separately shown in Fig. 13 where it is seen that two cams mounted to turn together can be operated in unison to effect the movements of the control arms to give the several desired adjustments.

The clutch control arm 99 is shown as carrying a cam follower or roll 198 while the strap control arm 149 carries a cam roll 199. The cam roll 198 runs on the periphery of a cam 200 while the roll 199 runs on the periphery of a cam 201. The two cams are shown turning loosely upon a fixed stud or axle 202 and secured to each other and to a driven disk 216 by a pin 203. The two cams may be turned between four positions. Thus as in Fig. 13 the clutch cam 200 engages by its point $d$ with the follower 198, corresponding with high speed transmission; and the cam 201 contacts at $d'$ with its follower. Both of the main clutches are closed, while the brake strap is loose.

If the connected cams be turned leftward so that point $c$ on the first cam and point $c'$ on the second cam contact the followers the second speed adjustment is attained, the second main clutch being opened and the brake strap tightened. Further rotation similarly brings the points $b$ and $b'$ into effect, the first clutch remaining closed and the second clutch and brake strap being open, resulting in low speed drive. Further rotation gives the extreme adjustment $a$ and $a'$ corresponding with zero speed or disconnection, both clutches and brake strap being released. By reversal of these rotary shifting movements of the cams the transmission can be changed from zero to low, second, and high to step up the speed correspondingly. The change from zero to low can only be done manually or by the intention of the driver, while the other shifts may be automatic, both for speed increase and speed decrease adjustments.

For the purpose of automatic rotation of the control cams 200 and 201 there may be employed a special motor 205 which may be an electric motor, reversible in direction to effect the shifts, and with means for disconnecting or stopping the motor in each of the four designated positions of the cams. The connections between the motor and the cams 200 and 201 may comprise the following gearing which may give a speed reduction, for example in the ratio of 460 to 1 between the fast turning motor and the slow turning cams.

The motor is shown attached beneath a fixed frame bracket 206. The motor shaft carries a pinion 207 which pinion meshes with a large gear 208 attached to the periphery of a disk 209 turning loosely on the reduced part 210 of the stud 202. The hub portion of the disk 209 carries a pinion 211 which in turn meshes with the periphery of a large gear 212 mounted on a counter stud 213 and having attached to it a pinion 214 which in turn engages a large gear or teeth 215 formed at the periphery of a disk 216 turning loosely on the stud 202 to the rear of the cams 200 and 201, as best shown in Figs. 9 and 12. The pin 203 which connects the cams 200 and 201 is extended through also into the disk 216, so that the two cams and the disk turn as a unit. Thereby when the motor rotates at high speed the cams turn one way or the other, in accordance with the direction of the current to the motor, at slow speed, between one and another of the four adjustment positions.

Referring next to the control of the motor, this might be effected manually, and in fact is effected by a pedal in shifting from zero to low speed, and the connections for this purpose, and the automatic connections for the further control of the motor will now be described. A double pole switch is preferably employed, with both parts of the switch movable, so that the motor can be disconnected or connected for rotation in either direction. A rotary switch of this character is indicated in the diagram in Fig. 11 and further details are shown in Figs. 12 and 14, with reference also to Figs. 1 and 2. A disk 219 of insulating material is shown mounted for limited rotary movement, being attached to a rock shaft 220. The disk carries two curved contacts or brushes 221 and 221$^a$ insulated from each other and spaced with substantial gaps 222 and 222$^a$ between them. Before describing the cooperating contacts and the wiring the pedal starting connections will be described, these comprising a radial arm 224 mounted on the disk 219 and extending downwardly to where it has a pin and slot connection with a connecting rod 225 extending forwardly into pivotal connection with a lever 226 which is pulled by a spring 227 to hold the upper end of the lever against a cam 228 mounted on the sliding stem 229 of the accelerator or pedal 230. When the pedal is depressed the cam throws the train of connections and the brush disk 219 is shifted to close the contacts and start the motor for shifting the control cams and throwing the transmission into low. The slot in rod 225 gives play for movements of the disk 219 after starting.

A pair of opposite contacts 232 and 232$^a$ cooperating with the gaps 222 and 222$^a$, and other opposite contacts 233 and 233$^a$ always contacting the respective brushes 221 and 221$^a$, are supported upon an insulating contact disk 234 arranged to turn loosely on the shaft 220. When the contacts 232 and 232$^a$ are centered in the gaps the motor is inoperative. When relative rotary movement shifts the brush disk 219 then the circuit is closed in one direction or the other to operate the motor in one direction or the other. Thus, for example, if the brush disk rotates clockwise in Figs. 11 and 12 the brush 221 will be contacted by the contact 232 and the brush 221$^a$ by the contact 232$^a$. In that condition the circuits may be as follows. From the contact 232 extends a conductor 236 to the field coil 237 of the motor and thence by conductor 238 to the contact 232$^a$ and brush 221$^a$. From the contact 233 extends conductor 239 to the motor armature 240, thence by conductor 241 to the battery 242, and thence by conductor 243 to the contact 233$^a$ and brush 221$^a$. This will give a direction of rotation to the motor armature, namely clockwise in Figs. 11 and 12, such as to turn the motor driven gearing and the control cams 200 and 201 to shift from high to second speed adjustment, the cams turning counterclockwise in Fig. 13 until the positions c and c' have been attained, giving a reduction in driven speed, when the motor circuits will be broken as will be described. When the brush disk is turned relatively in the opposite direction the opposite actions take place, for a relative increase of driven speed, the current from the battery passing in the same direction as before through the motor armature, but oppositely through its field coils.

The control operation is such that the progressive shift of the brush disk 219 is controlled according to the speed of the vehicle and is effected through a governor or centrifuge turned by the driven shaft. Whenever such a shift takes place, either for speed increase or decrease, the contacts of the rotary switch are closed one way or the other and the motor is thus put into operation in such direction that the disk 234 will be caused to turn and follow the movements of the disk 219, until the contacts 232 and 232$^a$ have moved around again into the gaps 222 and 222$^a$, when the motor will be cut off and stop; this act of adjustment shifting the control cams 200 and 201 and thereby making the change of driving adjustment either for increased or decreased speed, as the case may be.

The centrifuge mechanism governing the rotary shifts of the brush disk 219 may, for example, be as follows. The shaft 220 of the disk is shown as mounted in a bearing 245 extended from a housing 246 which in turn is attached to a housing 247 constituting an extension of the casing parts 78, 79, as seen in Figs. 1, 7, 12 and 14.

The turning of the shaft 220 through a sufficient arc to give the four adjustments a, b, c, d is shown as effected through a toothed sector 250 attached to the left or inner end of the shaft, this sector engaged by a rack 251 mounted on a slidable bar 252, so that the sliding of the bar swings the sector and turns the shaft. The bar also partakes of certain rotary movements, therefore the rack 251 is shown as having circular teeth, engageable with the sector in all positions of the bar.

The bar 252 turns with and is surrounded by a hollow shaft 253 the ends of which rotate in ball bearings 254 in the housing walls. The hollow shaft carries a sprocket wheel 256 and this sprocket wheel is driven through a chain 257 from the sprocket wheel 67 on the driven shaft, already mentioned, as shown in Fig. 1. By this arrangement the hollow shaft 253 constantly turns at a speed proportional to the speed of the vehicle, and it constitutes the governor shaft.

Surrounding the hollow governor shaft 253 is a sleeve 259 which can slide axially thereon. A pin 260 is shown extending from the sleeve 259 through the hollow shaft 253 and into the sliding rod 252, the hollow shaft having opposite slots 261 for the passage of the pin. By this means the sliding movements of the sleeve over the shaft are communicated through the slots and pin to move the rod axially. Rotary motion is conveyed to all these parts through the sprocket wheel 256. The governor details are shown in Figs. 5-8.

The rotary and slidable sleeve 259 carries a pair of outstanding projections or wings 263 each formed with a diagonal slot 264 constituting a cam, and within each cam slot runs a pin 266 forming part of a centrifugal governor weight or mass 267. Two such masses are shown and these are pulled toward each other by radial springs 268 and are thrown outwardly to varying degrees by the centrifugal force developed by the communicated rotary motion. The governor is represented more or less diagrammatically. It is to be understood that, as is usual with centrifugal governors, the movable masses tend to move outwardly to different radial extents corresponding with different speeds of rotation. Thus, at a certain high speed of the vehicle, above any speed that would require increase of ratio above unity, each of the masses will stand at its outermost position, as shown, whereas at lower speeds the masses may move inwardly progressively toward their innermost positions.

The masses are guided in radial guides 270 carried around with the governor shaft, and the outward movement of the masses causes the pins 266, working in the slots 264, to move the sleeve 259 rearward, namely to the position shown in Fig. 7. On the other hand lower vehicle speeds, allowing the pins to approach the axis, cause the sleeve to shift forward, the ends of the slots constituting limits to the inward and outward movements of the masses. The governor springs may be compound or multiple to give the desired definite action and offset the increase of centrifugal force with increase of radius, or any other type of governor may be employed for the purpose, the one shown being intended as a conventional illustration.

Instead of a gradual or progressive shift of the masses and of the sleeve, and therefore of the connected parts extending to the rotary switch, it is preferred that these should receive a sudden movement from one definite position to another, corresponding to the four positions $a$, $b$, $c$ and $d$, of the control cams 200 and 201. This snap action may be secured by the following expedient. Extending through each of the centrifugal masses is shown a yielding pin 272 having an internal spring and with a rounded nose projecting at each end in position to engage one or another of three notches 273 formed in the guides 270. This arrangement is clearly shown in Figs 7 and 8, where the pins 272 are in the outermost notches, marked $d$, corresponding to high.

If the vehicle slows down sufficiently to causes a shift of the governor masses, they will thus not shift at once, but the shift will be delayed until the inward pull of the governor springs 268 sufficiently overcomes the centrifugal force to dislodge the yielding pin 272 from the outermost notch, when the mass will shift inwardly with a snap movement, the pin becoming engaged yieldingly in the second notch $c$, shown for convenience at the opposite side. The three notches, $d$, $c$, $b$, determine three positions of adjustment, while the inner end of each cam slot 264 determines the limit of inward movement of the masses, at position $a$, with no drive, and the centrifuge not functioning. It should be explained that preferably the vehicle speed at ordinary "slow" is such that the centrifuge will stand at $b$ position, and thus maintain transmission and travel, return to zero speed being prevented, unless the vehicle is intentionally so much slowed down, as by brake or throttle, as to allow the centrifuge to drop to zero or $a$ position. A convenient way of unclutching by mere braking or throttling is thus afforded.

By the arrangement thus far described the rotary brush disk 219 will remain in any existing position, after the drive is once started, until the speed of the vehicle is changed so far as to cause the snap adjustment referred to, when the masses will move suddenly from one position to the next causing their pins to shift the sleeve 259 correspondingly whereby the rack 251 swings the sector 250 and gives a snap movement of the brush disk. This closes the circuit and starts up the motor to bring about a corresponding adjustment of the contact disk 234, which, as will appear, is also preferably given a snap movement from each position to the next, which is of particular importance in that, in breaking the motor circuit, the snap action tends to prevent the formation of an electric arc at the point of breaking contact.

The readjusting of the contact disk 234 from position to position with a snap action following each readjustment of the brush disk 219 is shown as effected from the rotation of the motor 205 which drives the two control cams 200 and 201. As already stated those two cams are turned by and with a toothed disk 216, and this disk carries and turns two other cams 290 and 291 by which the contact disk is readjusted. It will be convenient to describe the connections commencing at the contact disk 234.

The periphery of the contact disk is shown as having four adjacent notches 277, of rounded form, and engageable in turn by a pin or finger 278 pressed yieldingly into the notches by a spring 279, to position the disk. This affords the snap action, and the disk will hold its adjustment until sufficient readjusting pressure is applied to cause the finger 278 to be cammed out of one notch, the disk turning and the finger snapping into the next notch.

The connections to the contact disk 234 from the motor include a radial arm 281 swingable loosely on the shaft 220 (see Figs 12 and 14). A resilient connection between the arm and the disk may comprise a spring 282 shown in the form of a bent strip or wire secured to the disk by three attachments 283. The spring wire is so shaped as to contact the arm at both sides, so that if the arm is swung in either direction it will tend to turn the disk, the spring however yielding at first, so that the disk does not turn until the pressure of the spring is sufficient to cause the finger 278 to snap out of one notch into the next.

This radial arm 281 is shown connected by a link 285 with the free end of a swinging arm 286 fulcrumed on the housing 247 and forked at its lower end so as to afford two fingers or followers, namely the finger 287 overlying the right side of the cam disk 216 and the finger 288 overlying the left side of the disk, as shown in Figs. 12 and 15, the left finger carrying a reversely shaped follower 289.

Cooperating with the right and left followers 287 and 289 are the right and left cams 290 and 291 already mentioned, attached or formed on the disk 216, as seen also in Figs. 9 and 15. The right cam 290 is able to thrust outwardly or rearwardly only on its follower, to throw the radial arm 281 rearwardly, that is to the left in Fig. 12, to give speed-decreasing adjustments; while the left cam 291 is able only to pull its follower 289 inwardly or forwardly, to give the reverse motion to the radial arm, and speed-increasing adjustments.

As the parts are set in Fig. 12, as in all of Figs. 1 to 15, the high speed or low (unit) ratio drive is in effect. The connected followers 287 and 289 are shown engaging their cams 290 and 291 at points marked $d$, corresponding with the points $d$ and $d'$ on Fig. 13. The first or right cam 290 and follower 287 operate during speed decreases, as follows. The cam disk 216, turning counter clockwise in Fig. 12, brings the successive portions of the cam 290 into action on the follower 287. From the point $d$ the cam is first concentric but rises or curves outwardly shortly before reaching the second speed position $c$. Therefore, as the adjustments are being completed for the second speed drive the swinging arm 286 is thrust rearward (left in Fig. 12) by the cam, and as this motion is completed the radial arm 281 will take its next rearward position, and the contact disk 234 will snap around one space, thus registering its contacts with the gaps of the brush disk, and cutting off the current and stopping the motor. It was assumed that the car has slowed down substantially, due, for example, to an up-grade. The described movements cause the control cams to shift the drive to second speed.

If the car continues to slow down, indicating the need of low speed drive, the governor will contract and cause the brush disk 219 to shift another unit or space, and the motor will restart in the same direction as before to effect the necessary ratio adjustment and at the same time turn the disk 216. The cam 290 on disk 216, as before, is first concentric beyond the point $c$ and is then eccentric as it comes to the point $b$, so that the follower 287 and the radial arm 281 are thrown rearward, causing another snap shift, without sparking, of the switch contact disk 234. The control cams and drive are now at slow or $b$ position.

A further decrease of car speed may effect one or more adjustment in the same direction, for example if the engine is throttled down, or the brakes applied, or a substantial upgrade is encountered without opening the throttle. The governor will then cause another closing of the circuit by shift of disk 219, and an operation of the motor, which in turn will shift the cam 290 so that it will move around while the follower 287 travels relatively from $b$ to $a$. This will give the final rearward shift to the radial arm 281, a disconnection of all drive by the control cams, and a stoppage of the motor 205. Drive cannot be automatically restored since the governor has come to rest, and the motor circuit cannot again be closed except by the manual operation of depressing the button 230 of Fig. 2. But if the vehicle should accelerate, as on a downgrade, the governor will be able to make the initial and other shifts, all control being automatic except the initial starting of drive when the vehicle is at rest. If it is desired to maintain the drive in second or low when coasting this may be afforded by the semi-automatic arrangement of Figs. 16 to 21.

After restarting of drive and during increases of speed actions take place the reverse of those described through the motor driven cam 291 acting on the follower 289, which operates to pull the radial arm 281 step-by-step through its positions $b$, $c$ and $d$, as the car speed increases, and the respective switch parts snap from position to position. Owing to the fact that the two cams 290 and 291 act in reverse directions their contours are correspondingly shaped, that is from $a$ toward $b$ the second or left cam 291 is first concentric and then eccentric, and beyond $b$ is first concentric and then eccentric to the point $c$, etc. The result is that there are effective cam spaces between the contours of the two cams, as seen in Fig. 12, between the four spaced adjustment points. This separation of the contours not merely renders the action of each cam free from interference by the other, but gives the necessary loose motion or play for the snap action or sudden readjustment of the parts.

A reversal of drive may be effected by any convenient mode of actuation of the shift rod 101 to shift the sleeve 69 to reverse position, followed by a closing of the two main clutches, for example through the control cam 200 acting through the arm 99 and shaft 97 to allow the closing of the clutches by their closing springs, as described. When these shifts have been made the driven shaft will be turned reversely or clockwise in the ratio of 3.2 to 1.

On Fig. 12 has been indicated conventionally a mode of mechanical interconnection whereby these adjustments may be brought about in properly timed relation from a single controlling handle or lever. Thus a reversing lever 294 is shown having a fixed fulcrum 295, and provided with a pin and slot connection 296 to the shift rod 101, such that when the lever is swung rearward, or to the left in Fig. 12, the first part of the movement shifts the rod into reverse, the second part the movement being idle due to the slot running upon the pin. Below its fulcrum the reverse lever has a downward extension 297, the lower end of which is connected with a pin and slot connection 298 with a link 299 extending therefrom to the radial arm 224 of the brush disk 219 of the rotary switch. The slot 298 insures an idle movement in the first part of the throw of the lever before the final throw of the lever moves the link and shifts the arm into the position shown in Fig. 12, which is the same as the high speed position, both of the main clutches being thereby closed through the actuation of the motor 205 and the turning by it of the control cam 200. Return throw of reversing lever 294 restores the adjustments to zero or no drive.

The second embodiment of Figs. 16 to 21, shows a modified control which may be described as semi-automatic. The mechanical parts are similar to the other figures down to a certain point, as indicated by corresponding reference numbers, including the shaft 220 rocked by the centrifuge, the contact disk 234 shifted by link 285 from the circuit breaking cams 290, 291, and the actuating motor 205 controlled by the relative positions of the contact disk and brush disk. The modified elements of the second embodiment may be described as follows.

Instead of a rotary brush disk 219 keyed to the shaft 220 as in the first embodiment, a similar brush disk 301 is shown in Figs. 16 and 17, loose on the shaft 220, and the movements of which are adapted to be controlled jointly from the centrifuge through the shaft 220 and by manual control through the following connections. Attached to the disk 301 is shown an outwardly extending arm 302 to the end of which is pivoted the rear section 303 of a connecting link, as shown also in Fig. 18. This rear link portion is formed with a head or collar 304 from which extends a pin 305 slidable within a sleeve 306 extending rearwardly from the forward section 307 of the connecting link. Fairly strong springs 308 tend to hold the link portions 303 and 307 toward each other so as to shorten the combination link. This permits the section 307 to be shifted forwardly or rearwardly under manual control, while the rear section 303 must follow rearwardly, but can only follow forwardly, with speed increases, as permitted by the centrifuge control.

At its forward end the combination link is shown pivoted to one arm of a bell crank lever 309 fulcrumed at a convenient fixed point on the vehicle frame, the other arm of the bell crank being connected by a link 310 with a rock arm 311, as shown in Figs. 20 and 21. The rock arm 311 extends at a downward rearward slant from a rock shaft 312 which may be turned manually. For example, the rock shaft may extend at an upward slant inside the steering post 314 to a point above the steering wheel 315. At its upper end the rock shaft has attached to it a lever or handle 316 which may be swung manually to different positions over an arcshaped index or notched segment 317, the handle having a finger which may removably engage the notches.

To correspond with the four positions already described the notches are marked $d$ for high, $c$ for second, $b$ for low and $a$ for disengagement or zero speed. The handle is shown in the high speed or $d$ position, and the connected elements 301 to 312 are in corresponding position. When the handle is thrown from $d$ toward $a$ the connecting link 303, 307 moves rearward and the rotary disk 301 turns clockwise as seen in Figs. 17 and 18.

The connections by which the centrifuge controls the switch disk 301 jointly with the manual control may be as follows. The shaft 220, rocked between its four positions according to the speed of the vehicle acting through the centrifuge, is shown as having pinned to it a sector 320. The periphery of this sector constitutes a cam cooperating with a yielding follower or bar 322 slidable in a vertical slideway 323 and pressed downwardly by a spring 324 into peripheral engagement with the sector 320. By this arrangement the adjustment of the cam sector 320 by the shaft 220 may determine a series of different vertical positions of the spring follower. On Fig. 18, in dotted lines, the sector is indicated in position $d$, this part of the cam periphery of the sector acting to hold the follower at its highest position. The sector also has a position $c$ in which the follower will be somewhat lower, and positions $b$ and $a$ in which the lug will be still lower.

The follower 322, thus controlled from the centrifuge, cooperates with a stepped sector 326 which is keyed or pinned upon the hub of the switch brush disk 301, and engages with a dog 327 standing forward from the follower 322. The periphery of the sector 326 is shown as formed with a series of steps marked $d$, $c$, $b$ and $a$, with shoulders between $b$ and $c$ and $c$ and $d$. The step $d$ is at the longest radius and corresponds with the highest position of the dog 327, the dog being shown resting upon the step. The next step $c$ is at a shortened radius or lower level, while the steps $b$ and $a$ are still lower and may be at substantially the same level, or continuously connected, without shoulder, as indicated in Fig. 18.

The joint control of this mechanism may operate substantially as follows. The parts are shown in high or $d$ position and are adapted to be readjusted towards or to low and zero positions by the manual control of the handle 316, which throws the disk 301 and so readjusts the drive, and in so doing throws the sector 326 through its several adjustments, until the step or surface $b$ or $a$ is brought beneath the dog.

The manual control of the handle 316 is able to readjust the step sector 326 for speed decrease, as already explained, but is unable to shift it reversely for speed increase, except as permitted by the centrifuge and the cam sector 320. This is due to the fact that when the dog is dropped into position $c$ or $b$ it engages the shoulder and locks the sector 326 against shifting for increase of speed, which shifting must await the elevation of the dog by the sector 320. The result is that the throw of the handle 316 from low to second or high (from $b$ to $c$ or $d$) will merely stretch the springs 308 and elongate the connecting link 303, 307. The springs give a pull upon the disk 301, so that as rapidly as the increase of driven speed causes the shifting of sector 320, the sector 326 will be allowed to shift for speed increase as the dog 327 progressively lifts. This permits the operator to throw his handle at will directly into high, relaying on the automatic control to delay the shifting of drive into high until the increase of speed of the vehicle warrants it.

On the other hand, when the handle 316 is thrown from high into second or into low, this acts through the connecting link for the direct shifting of the sector 326 and the switch disk 301, which is followed by operation of the motor to change the transmission from high to second or low. This arrangement also permits the operator to set the handle 316 at some position other than high, namely, at second or at low, and this will fix a limit above which the transmission can not be readjusted by the centrifuge. For example, this is useful in running down grade as it permits the transmission to be maintained in the second speed, whereas otherwise the acceleration of the vehicle would operate the centrifuge to restore high. In other words a manual fixing of a limit is possible, and the automatic action is confined to or below that limit.

The arrangement of Figs. 16 to 21 therefore affords an automatic centrifuge control of the transmission readjustment, qualified however by the manual control which permits speed decreases to be imposed at will, and permits a limit to be set to the speed increasing adjustments effected by the centrifuge.

Whenever the handle 316 is thrown to the $a$ or zero position this adjusts the disk 301 to its extreme position, causing the motor to operate until the control cams have disconnected the two main clutches and discontinued all drive. Following this a manual action is necessary to restore drive, since the setting of the handle 316 at zero maintains the no-drive conditions, even if the centrifuge may be operating due to free movement or the coasting of the vehicle. It will be noticed that the surfaces $a$ and $b$ of the sector 326 are not separated by a shoulder, so that the sector may be readily adjusted manually between the $a$ and $b$ positions when the dog 327 rests on the continuous surface $a$—$b$. When the handle 316 is thrown from zero position $a$ to low position $b$ the sector 326 will at once take the $b$ position and the disk 301 will move correspondingly, causing the motor to operate to throw the control cams and transmission into low speed adjustment, with the first main clutch engaged.

In the modification of Figs. 1 to 15 the centrifugal governor is able to effect automatic transmission adjustments for speed increase, also for speed decrease, as already explained, with no direct manual control imposed, except for initial starting, and without any means to set a high limit to the driven speed. In the modification of Figs. 16 to 21 the governor is able to make automatic adjustments for speed increase, subject however to the manually set limit, and subject to the manual ability to effect speed decreases against the action of the governor. In this modification however the governor is not able to make adjustments for speed reduction because, as shown in Figs. 16 and 18, the sector 320 is not able to shift the sector 326 but merely to lift or lower the follower and its stop dog 327.

A further modification may be made whereby a governor may be employed to effect automatic adjustments of drive both for speed increase and speed decrease, while subject to manual control as to the maximum speed adjustment, so that, for example, the mechanism may be set, as in Figs. 16 to 21 so as to prevent the transmission from adjusting into high, and holding it in second speed, or even in low.

Figs. 22 and 23 show a modified form of governor and connections of particular value for the described purposes. In Fig. 23 is shown the driven shaft 60 having keyways 65 as in Fig. 1. Also the shift collar 69 is shown, and the modified governor is accommodated to the rear of the collar, directly on the driven shaft, and between the collar and the bearing 80. The governor of Fig. 23 is in effect four centrifuges connected in tandem. Reading from the front to the rear, that is from the right to the left on Fig. 23 there are shown four hubs 331, 332, 333 and 334, the first being pinned upon the driven shaft and the others slidable thereon, but rotatable therewith. Each of the hubs 331, 332 and 333 has radial guides 336 for the governor weights or masses indicated at 338, 339 and 340 respectively.

According to the principles of the modified governor the centrifugal masses are controlled by springs of varying strength. Thus the masses 338 are pulled inwardly by strong springs 341, the masses 339 by medium springs 342 and the masses 340 by weak springs 343. In the adjustment shown the vehicle is supposed to be traveling at high speed and all the masses are held in their outward positions, centrifugal force having overcome all of the springs. If springs of uniform strength are employed then masses of varying mass and pull will be used.

When the vehicle slows down to a speed such that the drive should be shifted from high to second the masses 338 will be snapped in by the strong springs 341 and effect the desired readjustment, the same happening through the springs 342 and 343 in shifting from second to low or low to neutral, the strength of the springs, with relation to the masses, being predetermined to make the shifts at the desired critical speeds.

The actual shifts may be made through the hub 334 which is shown in high speed position, but can be shifted forward to three successive other positions by the actions of the three centrifuges. For example there is shown on the masses 338 cam pins 345 engaging inclined cams 346 on the hub 332. Similar pins 347 on the masses 339 engage cams 348 on the hub 333; and pins 349 on the masses 340 engage cams 350 on the hub 334. As each successive pair of masses snaps inwardly its pins act on the cams, causing all of the hubs to the rear thereof to move forwardly, including the last hub 334 which is shown provided with a groove 352 engaging a roll 353 on a rock arm 354. Each mass is shown as having an inclined groove or shoulder 344 along which the cam slides and cooperating with the pin to displace the cam and hub.

As the parts are shown the four hubs are spaced apart. When the vehicle speed drops from high to medium the first centrifuge will close in and the gap between hubs 331 and 332 will close, thus shifting the grooved hub 334 by one space. When the second centrifuge acts the second gap will be closed and when the third centrifuge all the gaps will be closed, thus moving the grooved hub successively forward through its four positions. The reverse action takes place as the vehicle speed increases progressively from zero to high, so that normally the transmitting connections will be readjusted automatically for speed increase as well as speed decrease.

The rock arm 354 thus shifted by the centrifuge is mounted on a rock shaft 355, which consequently takes four positions according to the speed of the vehicle. The rock shaft 355 appears in Fig. 22 where it carries a rock arm 357 extending downwardly and connected by a link 358 with a sector 359 mounted on the shaft 220 of the switch disk 219, which disk is thus shifted through to four positions as already described, to govern the motor which effects the shifting of the transmission. The positioning of the switch disk and sector 359 may be assisted by an auxiliary resilient device 360 cooperating with four corresponding notches 361 on the sector. The connections to the motor and the adjustments made by the motor will not be further here referred to.

In order to permit auxiliary control of the switch disk movements, the rock arm 357 may be loose upon the rock shaft 355, but held resiliently in a given position by a stout spring 363. Above the fulcrum 355 is an extension arm 364 from which extends a link 365 to a manual adjusting means such for example as shown in Figs. 19 and 20.

Attached to the rock arm 357 is shown a link 367 having a slotted connection to a pin on a lever 368 which in turn is connected by a link 369 to the foot throttle such for example as shown in Fig. 2, so that in initially starting the described parts may be shifted from neutral to low to initiate the travel of the vehicle.

Fig. 22 shows also a reversing lever 371 arranged in such position that it may strike the end of the link 367 and thrust it from neutral to the position shown in Fig. 22, which effects the closing of the first and second main clutches of the transmission as is necessary for the reverse drive. The reverse lever is formed with a cam slot 372 engaging a pin 373 mounted on a lever 374 which may be connected to cause the shift of the rod 101 and thereby the sleeve 69 to put the reverse drive into gear.

By way of summarizing the invention and explaining the terminology of the appended claims, the following restatement is made. Referring first to the transmission itself, without respect to the coordinating of the shifts or adjustments for effecting speed changes, and without respect to the automatic or semi-automatic control thereof, the transmission, stated in a complete and specific manner, may be described as a combination of the following enumerated elements, subcombinations of which however are also made the subject of claim. The invention in this full aspect may be described as an apparatus for the mechanical transmission of power from a driving shaft 30—32, to a driven shaft 60 at variable relative driven speeds and torques, it being understood that high relative speed means low torque and vice versa, and reference to a shaft being intended to include any equivalent rotary member. Between the driving and driven shafts are the mechanical transmission elements which may be mentioned in the following convenient order. A first rotary member or shaft 105 may be connected with or disconnected from the driving shaft by a first clutch 32, 110, 37, this giving an easy frictional coupling and uncoupling action without jar, and when uncoupled being adapted to discontinue all drive. Generally it is understood that the rotary parts should be in axial alinement with the driving and driven shafts, except where stated otherwise. The next element is a second rotary member 128, 130, in connection with which is a second clutch 37, 120, 40 for clutching the second member to the driving shaft and first member or unclutching it. The purpose of clutching the second member to the driving shaft is to clutch it to the first member when the first member is clutched to the driving shaft, so that both members must turn in unison, affording high speed drive; and the disclosed clutch could obviously be replaced by means for directly clutching together the first and second rotary members, for the purposes of forward drive. The next element is a third rotary member 172, 175 which takes part in the slow drive (and reverse). A fourth rotary member 161, 162, 164 is normally arranged to turn with the driven shaft, being coupled thereto by its clutch teeth 163 engaging the teeth 71 on the driven shaft sleeve 69, so that normally (except during reverse) the fourth rotary member is effectually a part of the driven shaft. A first gear 119 is mounted concentrically on the first rotary member, this being a central spur gear, and rotating as part of the driving shaft when the first clutch is closed, which means at all times except at zero speed or no drive. A second gear 159 is similarly mounted on the driven shaft, or what is the same thing on the fourth rotary member, this gear functioning except in reverse. The internal-external gear member 156, 157 really constitutes a counter-gearing, and is eccentrically mounted on the second rotary member, its engagement in the eccentric recess being the equivalent of mounting on an eccentric shaft projecting rigidly from the member; and this first counter-gearing meshes with the first gear 119 and the second gear 159, giving a substantial speed reduction therebetween when the second rotary member is held stationary. The next element is the brake or shoe 136, constituting a means for shocklessly stopping and holding the second member by engagement upon its rim or drum, thus giving a fixed position to the axis of the reduction or counter-gearing, for the purpose of delivering second speed drive when the second clutch is opened and the first clutch is closed. The elements so far referred to afford high or full speed drive and second or intermediate speed drive. The low speed drive is through a gear 133 concentrically mounted on the second rotary member, this engaging a second counter-gearing 182, 186 turning on a fixed axis. Due to the fact that when the first clutch is closed and the second clutch is open the load of the driven shaft acting through the first counter-gearing causes the reverse rotation of the second rotary member, it is necessary to effect a subsequent reversal so that the slow drive may be forward; and therefore a reversing idler gear 189 is arranged as part of or to be driven by the second counter-gearing and in turn to drive a gear 174 on the third rotary member. This train gives a positive low speed drive to the third member and would require coupling and uncoupling from the driven shaft to permit second speed drive, which is obviated by the one-way drive device 170, 169, 165 introduced between the third rotary member and the driven shaft, or rather a part of the fourth rotary member turning with the shaft. Low speed drive is thus delivered when the first clutch is closed and the second clutch and brake are open, while the one-way device permits second speed drive to be applied by overrunning upon closing the brake on the second rotary member. With these elements is combined any sort of speed change shift means, manual or otherwise, such as lever 99 operating the two clutches and lever 149 operating the brake, so that the relative driven speed may readily be changed between no drive, low, second and high.

The combination is rendered complete for vehicle driving purposes by the introduction of an additional shift means, namely the rod 101 shifting the driven shaft sleeve 69, so as to disconnect or uncouple the driven shaft from the fourth rotary member and connect or couple it to the third rotary member. With this simple arrangement, by merely closing the second clutch and thus causing the high speed forward drive of the second rotary member, reverse drive will be transmitted through the second counter-gearing, the reversing idler, and the third rotary member to the driven shaft; both of these shifts being effected by the single handle 294.

The next feature of the invention has reference to the single means of effecting the co-ordinated speed change shift, consisting mainly of the combined cams 200 and 201 which have merely to be rotated between their four positions to operate upon the levers 99 and 149 and thereby the clutches and the brake. This avoids attention to the order of operation of the clutches and brake and coordinates them so that the shift of the control cams through their four positions changes the transmission progressively from no drive through slow and second speeds to high, and vice versa. This feature of the invention may be utilized by non-automatic or manual operation, by means of any suitable connections for turning the cams.

The final general feature of invention has reference to the automatic speed shift readjustments as already described, over which the operator may have partial control either by the manual button 230 in Fig. 2 or the manual handle 316 in Fig. 19, with of course such indirect control as is afforded by the operation of the usual engine throttle and vehicle brake.

There has thus been described a power transmitting apparatus embodying the principles and attaining the objects of the present invention. Since many matters of combination, operation, arrangement and structure may be various modified without departing from the principles it is not intended to limit the invention to such matters except to the extent stated in the appended claims.

What is claimed is:

1. Apparatus for the mechanical transmission of power from a driving shaft (30—32) to a driven shaft (60) at variable relative driven shaft speeds and torques, comprising in combination, a first rotary member (105), and a first clutch (32, 110, 37) for clutching the first member to the driving shaft, and adapted to be opened to discontinue all drive, a second rotary member (128, 130), and a second clutch (37, 120, 40) for clutching the second member to the driving shaft and first member, for high speed drive, a third rotary member (172, 175), a fourth rotary member (161, 162, 164) turning with the driven shaft, a first gear (119) concentrically mounted on the first rotary member, a second gear (159) concentrically mounted on the driven shaft or fourth rotary member, a first counter-gearing (156, 157) eccentrically mounted on the secondary rotary member, engaging with and giving speed reduction between the first gear and the second gear when the second rotary member is held, a brake (136) for stopping and holding the second member to give fixed position to the axis of the counter-gearing when the first clutch is closed and the second clutch is open, for second speed drive, a gear (133) concentrically mounted on the second member, a second counter-gearing (182, 186) driven thereby, a reversing idler gear (189) driven thereby, a gear (174) on the third rotary member driven by the idler gear, and a one-way drive device (170, 169, 165) between the third rotary member and driven shaft, for delivering low speed drive when the first clutch is closed and the second clutch and brake are open, but permitting second speed drive by overrunning upon closing the brake; and speed change shift means (99, 149) for closing and opening the first and second clutches and brake to change the relative driven speed between no drive, low, second and high.

2. A transmission apparatus as in claim 1 and wherein is shift means (101, 69) for disconnecting the driven shaft from the fourth rotary member and connecting it to the third rotary member, whereby when the second clutch is closed reverse low speed drive will be transmitted through the second rotary member, second counter-gearing and third rotary member to the driven shaft.

3. Apparatus for transmitting power from a driving shaft to a driven shaft at variable speed, comprising a first rotary member, a first clutch for clutching the first member to the driving shaft, a second rotary member, a second clutch for clutching the second member to the driving shaft and first member, a third rotary member, a fourth rotary member turning with the driven shaft, a first gear on the first rotary member, a second gear on the driven shaft or fourth rotary member, a first counter-gearing eccentrically mounted on the second rotary member, engaging with and giving speed reduction between the first gear and the second gear when the second rotary member is held, a brake for stopping and holding the second member, a gear on the second member, a second counter-gearing driven thereby, a reversing idler gear driven thereby, a gear on the third rotary member driven by the idler gear, and a one-way drive device between the third rotary member and driven shaft, and speed change shift means for closing and opening the first and second clutches and brake.

4. Apparatus for transmitting power from a driving shaft to a driven shaft at variable speed, comprising a first rotary member turning with the driving shaft, a second rotary member, a clutch for clutching the second member to the first member, a third rotary member, a fourth rotary member turning with the driven shaft, a first gear on the first rotary member, a second gear on the fourth rotary member, a first counter-gearing eccentrically mounted on the second rotary member, engaging with and giving speed reduction between the first gear and the second gear when the second rotary member is held, means for holding the second member, a gear on the second member, a second counter-gearing driven thereby, a gear on the third rotary member driven by the second counter-gearing, a one-way drive device between the third rotary member and driven shaft, and speed change shift means for closing and opening the clutch and brake.

5. Apparatus for transmitting power from a driving shaft to a driven shaft at variable speed, comprising a first rotary member turning with the driving shaft, a second rotary member, a second clutch for clutching the second member to the first member, a third rotary member, a first gear on the first rotary member, a second gear on the driven shaft, a reduction gearing mounted on the second rotary member, engaging with the first gear and the second gear when the second rotary member is held, means for holding the second member, a gear on the second member, a counter-gearing driven thereby, a gear on the third rotary member driven by the counter-gearing, a clutch between the third rotary member and driven shaft.

6. A transmitting apparatus as in claim 4 and wherein is shift means for uncoupling the driven shaft from the fourth rotary member and coupling it with the third rotary member, whereby to cause the reversal of the direction of low speed drive.

7. Apparatus for transmitting power from a driving shaft to a driven shaft at variable speed, comprising a first rotary member, a first clutch for clutching the first member to the driving shaft, a second rotary member, a second clutch for clutching the second member to the driving shaft and first member, a third rotary member, a fourth rotary member turning with the driven shaft, a first gear on the first rotary member, a second gear on the driven shaft or fourth rotary member, reduction gearing mounted on the second rotary member, engaging with and giving speed reduction between the first gear and the second gear when the second rotary member is held, a brake for stopping and holding the second member, a gear on the second member, a counter-gearing driven thereby, a gear on the third rotary member driven by the counter-gearing, and a one-way drive device between the third rotary member and driven shaft, and speed change shift means for closing and opening the first and second clutches and brake, comprising a plurality of control cams movable in unison, and a plurality of followers for said cams, with connections to said clutches and brakes, said cams and followers so coordinated that in successive positions the clutches and brake are operated to give no drive, low speed, second speed and high respectively.

8. Apparatus for transmitting power from a driving to a driven shaft at variable speeds, comprising a first clutch adapted to be opened for no drive and closed for low speed drive, gearing made effective by the closing of the first clutch for effecting low speed drive of the driven shaft, a second clutch adapted to be closed for high speed drive, a brake adapted to be closed for second speed drive, gearing made effective by the closing of said brake for effecting intermediate speed drive of the driven shaft, a controller comprising a plurality of cams movable in unison, and a plurality of followers for said cams with connections to said clutches and brakes, said cams and followers so coordinated that in successive positions the clutches and brake are operated to give no drive, low speed, second speed and high respectively.

9. Apparatus for transmitting power from a driving to a driven shaft at variable speed, comprising trains of connections for transmitting drive at a plurality of speeds, a shift means having an adjustment for no drive and other adjustments for low speed and higher speed drives respectively, and connections therefrom for setting the trains of connections accordingly, and a self acting means operated according to driven shaft speed and arranged to effect an adjustment of the shift means from one adjustment to a higher speed adjustment upon a predetermined increase in driven shaft speed, comprising a motor having a controller, a device responsive to driven shaft speed and connected to the controller to shift the same to operate the motor upon a given increase of speed, connections from the motor to the controller whereby after a given extent of operation the controller is shifted to render the motor inoperative, and other connections from the motor to the shift means to adjust the latter to a higher speed during such operation of the motor.

10. Apparatus for transmitting power from a driving to a driven shaft at variable speed, comprising trains of connections for transmitting drive at a plurality of speeds, a shift means having an adjustment for no drive and other adjustments for low speed and higher speed drives respectively, and connections therefrom for setting the trains of connections accordingly, and a self acting means operated according to driven shaft speed and arranged to effect an adjustment of the shift means from one adjustment to a higher speed adjustment upon a predetermined increase in driven shaft speed, such self acting means comprising a motor, a motor controller for causing the motor to be operative or inoperative, a governor actuated from the driven shaft, and having connections to shift the controller to operate the motor when the driven shaft exceeds a given speed, connections from the motor to the controller to shift the latter to render the motor inoperative after a given extent of operation, and connections from the motor to shift means to adjust the latter to the next higher speed adjustment during such extent of operation.

11. Apparatus as in claim 10 and wherein is means operable at will for causing the shift means to be adjusted from no drive to low speed adjustment.

12. Apparatus for transmitting power from a driving to a driven shaft at variable speed, comprising trains of connections for transmitting drive at a plurality of speeds, a shift means having an adjustment for no drive and other adjustments for low speed and higher speed drives respectively, and connections therefrom for setting the trains of connections accordingly, means operable at will for adjusting the shift means from no drive to low speed drive, and a self acting means operated according to driven shaft speed and arranged to effect an adjustment of the shift means from one adjustment to a higher speed adjustment upon a predetermined increase in driven shaft speed, such self acting means comprising an electric motor, a double acting switch for energizing or deenergizing the motor, a centrifuge actuated from the driven shaft, and having connections to close the switch to operate the motor when the driven shaft exceeds a given speed, connections from the motor to open the switch after a given extent of operation, and connections from the motor to the shift means to adjust the latter to the next higher speed adjustment during such extent of operation 13. Apparatus for transmitting power from a driving to a driven shaft at variable speed, comprising trains of connections for transmitting drive at low, second and high forward speeds, a shift means for such trains having adjustments for low, second and high speed drive respectively, and mechanism operated according to driven shaft speed and adapted to effect automatic adjustment of the shift means from any adjustment to the next higher or lower speed adjustment upon a predetermined increase or decrease in driven shaft speed, comprising a reversible motor having a controller with two oppositely operative and one neutral positions, a device responsive to driven shaft speeds and connected to the controller to shift the same from neutral with substantial changes of speed, connections whereby the motor during operation shifts the controller to neutral, and other connections whereby the motor during such operation shifts the shift means to a higher or lower speed adjustment.

14. Apparatus for transmitting power from a driving to a driven shaft at variable speed, comprising trains of connections for transmitting drive at low, second and high forward speeds, a shift means for such trains having adjustments for low, second and high speed drives respectively, and mechanism operated according to driven shaft speed and adapted to effect automatic adjustment of the shift means from any adjustment to the next higher or lower speed adjustment upon a predetermined increase or decrease in driven shaft speed, such mechanism comprising a reversible motor, a controller having neutral and two active positions for controlling the motor, a centrifuge operated by the driven shaft adapted to shift the controller from neutral to one or the other active position with substantialy increase or decrease of driven shaft speed, and connections from the motor for readjusting its controller to neutral and at the same time adjusting the shift means to higher or lower speed adjustment.

15. Apparatus for transmitting power from a driving to a driven shaft at variable speed, comprising trains of connections for transmitting drive at low, second and high speeds, a shift means having adjustments for low speed, second speed and high speed drives respectively, and connections therefrom for setting the trains of connections accordingly, and a self acting means operated according to driven shaft speed and arranged to effect an adjustment of the shift means from one adjustment to the next higher or lower speed adjustment upon a predetermined increase or decrease in driven shaft speed, such self acting means comprising an electric motor, reversible in direction, a double acting double throw switch for causing the motor to be inoperative, or operative in either direction, a governor actuated from the driven shaft, and having connections to shift the switch from neutral to operate the motor in a certain direction when the driven shaft increases or decreases in speed, connections from the motor to the switch to shift the latter back to neutral to render the motor inoperative after a given extent of operation, and connections from the motor to the shift means to adjust the latter to the next higher or lower speed adjustment during such extent of operation.

16. Apparatus as in claim 9 and wherein is a limiting device applicable at will to prevent the shift of the controller above a predetermined adjustment.

17. Apparatus as in claim 9 and wherein is a device operable at will and dominating the self acting means to effect adjustments of the shift means from each adjustment to the next lower adjustment.

18. Apparatus for transmitting power from a driving to a driven shaft at variable speed, comprising trains of connections for transmitting drive at low, second and high speeds, a shift means having adjustments for low speed, second speed, and high speed drives respectively, and connections therefrom for setting the trains of connections accordingly, a centrifuge driven by the driven shaft and having positions corresponding to the several drives, an electric motor reversible in direction, and having connections for adjusting the shift means from each adjustment to the next in each action thereof, a switch having an open position and reversed closed positions for controlling the motor, connections from the centrifuge for changing the switch from open to a selected closed position according to changes of driven speed, and connections from the motor adapted in each action thereof to restore the switch to open position.

19. Apparatus as in claim 18 and wherein the switch comprises two parts both movable, one part moved from the centrifuge in each action to meet the other and close the motor circuit, the other part moved by double acting cam means from the motor in each action to break contact with the first part, leaving the motor inactive.

20. Apparatus as in claim 18 and wherein the switch comprises two parts both movable, one part moved from the centrifuge in each action to meet the other and close the motor circuit, the other part moved by double acting cam means from the motor in each action to break contact with the first part, leaving the motor inactive, and the movements of each switch part being a snap movement, the connections comprising spring means and jump delaying means.

21. In a power transmitting apparatus, speed shift means, and a centrifuge device controlling the action thereof according to changes of driven speed, said centrifuge device comprising a plurality of shiftable members (334, 333 etc.) in tandem relation, and separate centrifuges therefor, the first centrifuge adapted to operate at a given speed to shift the first member, the second centrifuge at a given higher speed to shift the second and thereby the first member, a further distance, and so on.

22. Variable speed transmitting mechanism comprising in combination a rotary driving member, an intermediate second rotary member, and a rotary driven member; a first gear train comprising a first gear turned by the driving member and a second gear turning with the driven member and connecting gearing mounted on the intermediate member and connecting the first gear with the second gear to cause reduced speed drive of the driven member when the intermediate member is held, at a speed below that of the driving member, with means for holding the intermediate member to impose such drive; and a second gear train between the intermediate member and driven member operative when the intermediate member is free comprising a third gear turning with the intermediate member and a fourth gear turning with the driven member and a connecting gearing between said third and fourth gears, with a one-way-drive device in said second gear train.

23. Mechanism as in claim 22 and wherein when the intermediate member is free the driven member drops to a lower speed, the intermediate member then assuming rotation, and the two gear trains coacting to impose the lower speed on the driven member, the one-way-drive device permitting the driven member to overrun the second gear train when the intermediate member is held against free rotation.

24. Mechanism as in claim 22 and wherein when the intermediate member is free the driven member drops to a lower speed, the intermediate member then assuming reverse rotation, and the two gear trains coacting to impose the lower speed on the driven member, the one-way-drive device permitting the driven member to overrun the second gear train when the intermediate member is held against free rotation, and the second gear train comprising a reversing gear or idler so that the lower speed drive is forward.

25. Variable speed transmitting mechanism comprising in combination a rotary driving member, an intermediate second rotary member, and a rotary driven member; a first gear train comprising a first gear turned by the driving member and a second gear turning with the driven member and planetary gearing mounted on the intermediate member and connecting the first gear with the second gear to cause reduced speed drive of the driven member when the intermediate member is held, at a speed below that of the driving member, with means for holding the intermediate member to impose such drive; and a second gear train between the intermediate member and driven member operative when the intermediate member is free comprising a third gear turning with the intermediate member and a fourth gear turning with the driven member and a countergearing connecting said third and fourth gears, with a one-way-drive device in said second gear train permitting overrunning when the intermediate member is held.

26. Variable speed transmitting mechanism comprising in combination a rotary driving member, an intermediate second rotary member, and a rotary driven member; a first gear train comprising a first gear turned by the driving member and a second gear turning with the driven member and connecting gearing mounted on the intermediate member and connecting the first gear with the second gear to cause reduced speed drive of the driven member when the intermediate member is held, at a speed below that of the driving member, with means for holding the intermediate member to impose such drive; a second gear train between the intermediate member and driven member operative when the intermediate member is free comprising a third gear turning with the intermediate member and a fourth gear turning with the driven member and a connecting gearing between said third and fourth gears, with a one-way-drive device in said second gear train; and means for clutching the intermediate rotary member to the driving member thereby preventing play of the first gear train and imposing direct drive of the driven member at the full speed of the driving member.

27. Variable speed transmitting mechanism comprising in combination a rotary driving member, an intermediate second rotary member, and a rotary driven member; a first gear train comprising a first gear turned by the driving member and a second gear turning with the driven member and connecting gearing mounted on the intermediate member and connecting the first gear with the second gear to cause reduced speed drive of the driven member when the intermediate member is held, at a speed below that of the driving member, with means for holding the intermediate member to impose such drive; a second gear train between the intermediate member and driven member operative when the intermediate member is free comprising a third gear turning with the intermediate member and a fourth gear turning with the driven member and a connecting gearing between said third and fourth gears, with a one-way-drive device in said second gear train; a driving shaft ahead of the driving member, and means for clutching the driving member to the driving shaft, or unclutching it to discontinue drive.

28. Variable speed transmitting mechanism comprising in combination a rotary driving member, an intermediate second rotary member, and a rotary driven member; a first gear train comprising a first gear turned by the driving member and a second gear turning with the driven member and connecting gearing mounted on the intermediate member and connecting the first gear with the second gear to cause reduced speed drive of the driven member when the intermediate member is held, at a speed below that of the driving member, with means for holding the intermediate member to impose such drive; a second gear train between the intermediate member and driven member operative when the intermediate member is free comprising a third gear turning with the intermediate member and a fourth gear turning with the driven member and a connecting gearing between said third and fourth gears, with a one-way-drive device in said second gear train; a driving shaft ahead of the driving member, and means for clutching the driving member to the driving shaft, or unclutching it to discontinue drive; and means for clutching the intermediate rotary member to the driving member thereby preventing play of the first gear train and imposing direct drive of the driven member at the full speed of the driving member.

29. Variable speed transmitting mechanism comprising in combination a rotary driving member, an intermediate second rotary member, and a rotary driven member; a first gear train comprising a first gear turned by the driving member and a second gear turning with the driven member and connecting gearing mounted on the intermediate member and connecting the first gear with the second gear to cause reduced speed drive of the driven member when the intermediate member is held, at a speed below that of the driving member, with means for holding the intermediate member to impose such drive; a second gear train between the intermediate member and driven member operative when the intermediate member is free comprising a third gear turning with the intermediate member and a fourth gear turning with the driven member and a connecting gearing between said third and fourth gears, with a one-way-drive device in said second gear train; and means for imposing reduced speed drive in reverse direction comprising means for clutching the intermediate member to the driving member and means for rendering inoperative the first gear train and causing the second gear train to transmit with speed reduction from the intermediate member to the driven member.

30. Variable speed transmitting mechanism comprising in combination a rotary driving member, an intermediate second rotary member, and a rotary driven member; a gear train comprising the following gears all in transverse alinement, an external first gear concentrically mounted upon the driving member, an internal second gear concentrically mounted upon the driven member, and connecting gearing eccentrically mounted on the intermediate member consisting of an internal gear engaging the first gear and an external gear engaging the second gear, to cause reduced speed drive of the driven member when the intermediate member is held, at a speed below that of the driving member, with means for holding the intermediate member to impose such drive; and means for transmitting drive at a different speed when said intermediate member is not held.

In testimony whereof, this specification has been duly signed by:

JOHN REECE.
FRANKLIN A. REECE.